US011828619B2

(12) United States Patent
Adler

(10) Patent No.: US 11,828,619 B2
(45) Date of Patent: Nov. 28, 2023

(54) IDENTIFICATION AND VALIDATION OF ROADS USING AERIAL IMAGERY AND MOBILE LOCATION INFORMATION

(71) Applicant: SOURCEWATER, INC., Houston, TX (US)

(72) Inventor: Joshua Adler, Houston, TX (US)

(73) Assignee: SOURCEWATER, INC., Houston, TX (US)

( * ) Notice: Subject to any disclaimer, the term of this patent is extended or adjusted under 35 U.S.C. 154(b) by 175 days.

(21) Appl. No.: 17/358,685

(22) Filed: Jun. 25, 2021

(65) Prior Publication Data

US 2021/0397835 A1 Dec. 23, 2021

Related U.S. Application Data

(63) Continuation of application No. 16/857,638, filed on Apr. 24, 2020, now Pat. No. 11,048,937, which is a continuation of application No. 16/506,446, filed on Jul. 9, 2019, now Pat. No. 10,635,904.

(51) Int. Cl.
| | |
|---|---|
| *G06F 16/29* | (2019.01) |
| *G01C 21/00* | (2006.01) |
| *G06V 20/10* | (2022.01) |
| *G06F 18/25* | (2023.01) |

(52) U.S. Cl.
CPC ..... *G01C 21/3852* (2020.08); *G01C 21/3815* (2020.08); *G01C 21/3826* (2020.08); *G06F 16/29* (2019.01); *G06F 18/25* (2023.01); *G06V 20/176* (2022.01); *G06V 20/182* (2022.01); *G06V 2201/10* (2022.01)

(58) Field of Classification Search
CPC .................................................. G01C 21/3852
See application file for complete search history.

(56) References Cited

U.S. PATENT DOCUMENTS

| | | | |
|---|---|---|---|
| 7,336,078 B1 | 2/2008 | Merewether et al. | |
| 8,346,578 B1 * | 1/2013 | Hopkins, III | .......... G06Q 50/16 |
| | | | 705/14.66 |
| 9,389,084 B1 | 7/2016 | Chen et al. | |

(Continued)

FOREIGN PATENT DOCUMENTS

WO  2012/143896 A2  10/2012

OTHER PUBLICATIONS

Any reference or information that is not included with this Information Disclosure Statement can be found in U.S. Appl. No. 16/857,638 to which this application claims priority.

(Continued)

*Primary Examiner* — Oneal R Mistry
(74) *Attorney, Agent, or Firm* — MEDLER FERRO WOODHOUSE & MILLS

(57) ABSTRACT

Systems and methods are described for identifying and validating the routes and characteristics of roads unknown to a road mapping database. The systems and methods may combine feature recognition analysis of aerial images with other information sources such as location tracking information from a mobile device or client in order to improve the accuracy of road information stored within a road mapping database. The systems and methods may also facilitate the collection of additional information regarding the characteristics of the identified roads from a client device or user thereof.

20 Claims, 13 Drawing Sheets

(56) References Cited

U.S. PATENT DOCUMENTS

| | | |
|---|---|---|
| 10,339,646 B1 | 7/2019 | Adler |
| 10,346,725 B2 | 7/2019 | Weller et al. |
| 10,635,904 B1 | 4/2020 | Adler |
| 11,048,937 B2 | 6/2021 | Adler |
| 11,392,625 B2 | 7/2022 | Strong et al. |
| 2006/0122776 A1 | 6/2006 | Knowles et al. |
| 2007/0025595 A1 | 2/2007 | Koizumi et al. |
| 2009/0177458 A1 | 7/2009 | Hochart et al. |
| 2011/0064312 A1* | 3/2011 | Janky ............ G06F 18/00 382/195 |
| 2011/0153190 A1* | 6/2011 | Rolinski ........... G01C 21/206 701/533 |
| 2011/0153368 A1* | 6/2011 | Pierre ............. G06Q 10/067 715/848 |
| 2013/0170694 A1 | 7/2013 | Thornberry et al. |
| 2013/0226667 A1 | 8/2013 | Terrazas et al. |
| 2014/0278055 A1* | 9/2014 | Wang ............. G16B 99/00 701/409 |
| 2015/0052460 A1* | 2/2015 | Mohammad Mirzaei ............. G01C 21/20 715/764 |
| 2015/0170388 A1* | 6/2015 | Chawathe ........... G06T 11/60 345/629 |
| 2015/0221079 A1 | 8/2015 | Schultz et al. |
| 2015/0269720 A1 | 9/2015 | Mondello |
| 2015/0285656 A1 | 10/2015 | Verheyen et al. |
| 2015/0302253 A1 | 10/2015 | Stewart |
| 2016/0180197 A1 | 6/2016 | Kim et al. |
| 2016/0275801 A1 | 9/2016 | Kopardekar |
| 2017/0172077 A1* | 6/2017 | Wouhaybi ........... A01G 25/16 |
| 2017/0200090 A1 | 7/2017 | Hershey et al. |
| 2017/0236284 A1* | 8/2017 | Elliethy ............ G06T 7/33 382/294 |
| 2017/0336806 A1* | 11/2017 | Blanc-Paques ....... G08G 5/045 |
| 2017/0337524 A1 | 11/2017 | Durand et al. |
| 2017/0358068 A1 | 12/2017 | Strebel et al. |
| 2018/0174446 A1* | 6/2018 | Wang ............. G08G 1/096716 |
| 2018/0218214 A1 | 8/2018 | Pestun et al. |
| 2018/0239991 A1 | 8/2018 | Weller et al. |
| 2018/0260626 A1 | 9/2018 | Pestun et al. |
| 2019/0050625 A1 | 2/2019 | Reinstein et al. |
| 2019/0130641 A1 | 5/2019 | Barajas Hernandez et al. |
| 2020/0011684 A1* | 1/2020 | McErlain, II ...... G01C 21/3841 |
| 2020/0310450 A1* | 10/2020 | Reschka ........... B60W 60/0011 |
| 2021/0019516 A1* | 1/2021 | Mittal ............. G01C 21/3819 |

OTHER PUBLICATIONS

Boucher et al., "Dua 1-GPS fusion for automatic enhancement of digital OSM roadmaps", Satellite Telecommunications (ESTEL), 2012 IEEE First AESS European Conference On, IEEE, pp. 1-6 (Oct. 2, 2012).

Fortier et al., "Automated Correction and Updating of Road Databases from High-Resolution Imagery", Canadian Journal of Remote Sensing 27(1):76-89 (Feb. 1, 2001).

Lin et al., "Development of a UAV-MMS-Collaborative Aerial-to-Ground Remote Sensing System A Preparatory Field Validation" IEEE Journal of Selected Topics in Applied Earth Observations and Remote Sensing. IEEE. USA 6(4):1893-1898 (Aug. 1, 2013).

Soni et al., "A comparison of road network extraction from High Resolution Images", 2018 First International Conference on Secure Cyber Computing and Communication (ICSCCC), IEEE, Dec. 15, 2018 (Dec. 15, 2018), pp. 525-531.

Xiao et al., "A New Method for Discovery of Vegetation Changes based on the Satellite Ground Photographs", 2015 8th Internation Processing (CISP 2015), pp. 851-856.

Zhao et al., "A new method of road network updating based on floating car data", Geoscience and Remote Sensing Symposium (IGARSS), 2011 IEEE International, IEEE, Jul. 24, 2011 (Jul. 24, 2011), pp. 1878-1881.

* cited by examiner

IDENTIFICATION AND VALIDATION OF ROADS USING AERIAL IMAGERY AND MOBILE LOCATION INFORMATION

TECHNICAL FIELD

The present invention generally relates to systems and methods for identifying and validating the routes and characteristics of roads unknown to a road mapping database. Applications of the present invention may include identifying and validating the routes and characteristics of roads crossing privately-owned terrain in oilfield regions.

BACKGROUND

On-shore oilfield regions may span large geographical areas of remote terrain with limited accessibility and under-developed transport links. These regions are often characterized by a multitude of oilfield well sites, interconnected to public road infrastructure via unpaved or gravel roads. A well site may consist of a clearing on which a well pad has been constructed and on which an oil or gas drilling rig is installed. Additional equipment may also be located at a well site in order to enable processing or storage of either the hydrocarbon product itself, or of other fluids or materials used as part of its production, such as water.

Water is used as an injectate for hydraulic fracturing (or fracking) wherein it is injected into shale rock under pressure in order to create or expand cracks to facilitate the extraction of subterranean natural gas and oil. Water may also often be recovered, produced or released as part of the hydraulic fracturing operation. This water may be a return of the injected water or may be underground water that is released as a result of the fracturing. The quantity of the returned water can often be large, for example, exceeding by far the quantity of oil obtained from the well. The nature of the fracturing process therefore brings about a requirement not only to source large amounts of water at the outset of a project, but also to dispose-of or treat and recycle water during the project or upon its completion. Such water may be stored in frac-water pits, also known as frac ponds or frac-water impoundments.

To assist with efficient water management in the energy industry, tools to facilitate a dynamic online platform for water sourcing, recycling and disposal may be employed in which buyers and sellers of water source or disposal capacity may advertise or exchange information related to either an availability-of or a requirement-for water, including a number of relevant attributes such as its quantity, location, type, and quality. Such an online platform may address not only the water resource needs associated with oilfield exploration and development, but also the need and supply of other associated oilfield resources, services, or infrastructure.

For maximum utility, the online platform requires up-to-date information regarding well sites and other oilfield-related features. To identify these, aerial images may be processed to pinpoint their locations, to classify the type of oilfield feature or to assess a current status of the oilfield feature. Oilfield feature types may include for example, an oilfield development site, a frac-water pit (sometimes known as a frac pond or frac-water impoundment), a well pad, a drilling rig, pipeline infrastructure, a service road, a clearing, a tank battery, a proppant store, a drilling reserve pit, a frac spread, a sand mine, a producing well, a flare system and so forth. Such information may be stored within an oilfield feature database that is accessible by users or subscribers of the online platform. Users of the online platform may span a number of different job functions related to the oilfield energy industry, including for example, employees of oilfield operators, construction contractors, and suppliers of resources, equipment or services.

Many of these users may be involved in field work or field visits to well sites or processing facilities. Mobile applications (running on a mobile device such as a smartphone or other suitable computing platform such as a tablet) have also been developed that may communicate with an online platform to allow a database of known oilfield sites to be searched and displayed for example visually on map. The mobile application may also display additional information regarding the oilfield sites to the user, such as the aforementioned availability-of or need-for oilfield water or other resources, materials or services.

Online platforms may also be enhanced to provide navigational information and services such that personnel may efficiently locate oilfield sites. In the case that a user's mobile device is location-enabled (for example incorporates a Global Positioning System—GPS—or other suitable location system receiver) an application within the mobile device may support the navigational services and guide users to a particular oilfield site of interest. The mobile application may also send information regarding the location of the mobile device to the online platform where it may be used for example by oilfield operators to locate their employees.

Oilfield workers are heavily reliant on vehicular transportation to convey themselves, construction machinery, materials, supplies, oil, gas or water, from one place to another within oilfield regions, such as between oilfield well sites, frac-water pits and processing facilities. Whilst the aforementioned online platforms may be able to provide information regarding oilfield features or to assist users in navigating to them, there is currently a lack of detailed knowledge concerning the roads that interconnect them, and this can inhibit the practical utility of the system. The remote nature of the terrain, coupled with the fact that much of the land is privately owned, leads to a situation in which a high proportion of roads in oilfield regions are unknown to current road mapping databases, navigation platforms or applications. Signage in these regions is also limited or non-existent. In such circumstances, oilfield workers may spend significant time trying to locate oilfield sites or correcting for navigational errors, leading to a loss in operational efficiency and an increase in costs. Furthermore, the quality of roads in oilfield regions may vary substantially, for example from wide and smooth paved surfaces, to narrow dirt, gravel or rocky tracks and some roads may be unsuitable for certain types of vehicle, or poorly suited to a certain task.

In light of the above, there is therefore a need for improved systems and methods for determining the routes and characteristics of roads unknown to road mapping databases, particularly in oilfield regions.

SUMMARY

In a first example, a method is described for identifying private roads, the method comprising receiving an aerial image of a portion of global terrain; receiving information on land ownership for the portion of global terrain; processing the aerial image to identify a candidate road located on private land within the portion of global terrain; receiving location tracking information from a mobile device, the location tracking information comprising a plurality of recorded mobile device location points; determining a spatial match between the location tracking information and the candidate road and responsive to the determining, storing the candidate road as a private road within a road mapping database.

In a second example, a method is described for identifying roads, the method comprising receiving location tracking information from a mobile device, the location tracking information comprising a plurality of recorded mobile device location points; determining an absence of a first spatial match between the location tracking information and routes of known roads within a road mapping database; responsive to the determining the absence of the first spatial match, selecting a portion of global terrain and an aerial image corresponding to the absence of the first spatial match; processing the aerial image to identify a candidate road within the portion of global terrain; determining a second spatial match between the location tracking information and the candidate road and responsive to the determining of the second spatial match, storing the candidate road within the road mapping database.

In a third example, an interactive user system is described for identifying roads unknown to a server, the system comprising: a display device; a user input device; a computer memory storing instructions; and a processor configured to execute the instructions to: store location tracking information comprising a plurality of recorded location points; transmit the location tracking information to a server; receive, from the server, a message indicating that the location tracking information does not correspond to roads known to the server; generate a notification that a journey is using an unknown road responsive to the message; display the notification and a user interface enabling entry of metadata associated with the unknown road; receive the metadata; and transmit the metadata to the server.

Other aspects and advantages of the invention will become apparent from the following detailed description, taken in conjunction with the accompanying drawings, which illustrate by way of example the principles of the invention.

DETAILED DESCRIPTION

Figure 1A:
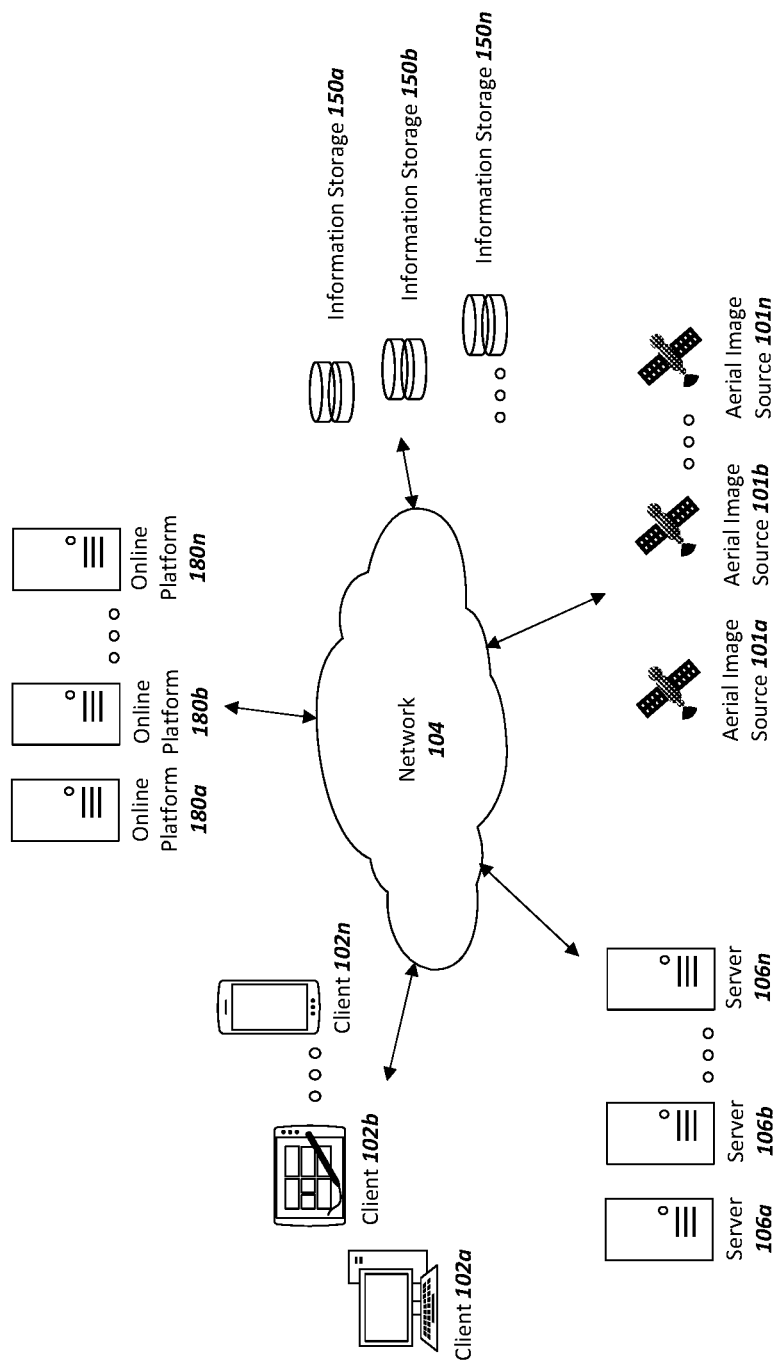
FIG. 1A is a block diagram depicting an embodiment of a network environment comprising client devices in communication with online platform devices, information storage devices, and server devices, according to some embodiments.

Navigation systems typically utilize a database of known roads to generate graphical maps for display to a user and to determine appropriate routes between a starting point and a destination point. Such mapping databases often contain additional information such as road names or numbers, road types (for example whether a road is a freeway, major highway, minor highway or street), the locations of intersections or junctions, turn restrictions at junctions and so forth. Mapping databases may also contain information on non-road features or points of interest (POI's) such as gas stations, restaurants or parking lots.

In the context of areas of terrain used for oilfield exploration (or in other remote or undeveloped areas), many roads may be unknown to current mapping databases. Such roads may route across privately-owned land (so-called leased roads), may be unpaved or of variable surface quality and may lack any numbering, naming or signage. However, knowledge of these roads can often be critical to navigate efficiently to a particular destination within such regions.

Aerial images, such as those captured by imaging devices located on satellites orbiting the earth, serve as one tool that may be applied to better understand the earth's terrain and its topology, and which is therefore also applicable to the problem of road identification for use within a navigational database. The aerial images may be processed manually to identify features within the terrain, such as lakes, rivers, roads and buildings, or (at higher resolutions) individual vehicles, trees, or people. Automatic identification of terrain features within aerial images is also possible using image recognition techniques. In particular, Artificial Intelligence (AI) techniques may also be suitable to accomplish this complex task. The application of AI to the image-based feature recognition task involves providing a set of so-called training images to an input of a neural network or other machine learning model, along with an associated set of known 'correct' classifications of features present within the image, for example, an indication as to whether the image contains a cat, a house or a car. Multiple training images (and classifications for each) are provided to the model in an iterative fashion, and each time the model is updated such that the error between its classification (when presented with the training image) and the correct classification, is reduced. Subsequent to the training phase, the model may then be applied to a set of so-called working images for which the correct classifications are unknown. The primary task of the model is then to determine the presence-of (or to classify) features within those working images.

Thus, AI-based image processing techniques may be used to identify and record, within a database, features depicted within aerial images of terrain. In the context of identifying features of relevance to the energy industry (such as oil and gas, solar, wind and hydroelectrical) such techniques are described for example in U.S. patent application Ser. No. 16/425,192 filed 29 May 2019, the contents of which are incorporated herein, in which features of interest include (amongst others) oilfield well sites, well pads, drilling rigs, pipeline infrastructure, service roads, clearings, vehicles, storage facilities, solar panel arrays, wind energy collectors, electrical substations, buildings, fences, and cable systems.

However, feature recognition using image processing of aerial images is not always 100% accurate, and such models can incorrectly classify features. By means of example, a feature recognition model may misclassify stream run-off as a road since both may have similar visual characteristics within a satellite image. Other features that may resemble a road include, without limitation, rivers, streams, drainage or irrigation channels, walking trails, cycle paths, animal trails, all-terrain vehicle (ATV) or logging trails. Additionally, the application of artificial intelligence models and algorithms to large areas of terrain requires a significant amount of computational processing power, hence for practical reasons, it may be necessary to restrict the application of this technique to specific areas of terrain at a time.

Other methods may also be used to identify or record the presence and location of roads for use within a navigational or mapping database. For example, a series of location points along the route of a road that is unknown to the mapping database may be recorded (and optionally, reported) by a location-enabled mobile device. In some examples, the mapping database may reside locally within the mobile device, whilst in other examples, the mapping database may reside within a server to which the mobile device is connected via a network. The location points may be determined using any suitable location technology present on the mobile device, such as the Global Positioning System (GPS), and used to define the route of the road. Alternatively, a network with which the mobile device communicates, may determine the location of the mobile device using a network-based location technology. In either case, the resulting information regarding the route of the road may then be used to update the mapping database for later reference and use.

However, location technologies are subject to some degree of measurement inaccuracy arising, for example, due to the number of visible satellites and the bandwidth and propagation of the radio signals on which the location technology is based. Such radio propagation conditions may be affected by obstacles such as trees or a vehicle roof, and by weather conditions such as cloud and rain. Hence, a recorded location track may not always accurately represent the route of a road. Additionally, the spatial separation between successive location samples of a recorded track may be relatively low, leading to a low spatial resolution of the route of the road in the mapping database. This is especially the case if the rate of location sampling on the mobile device is set low in order to conserve battery power. As a further consideration, a recorded location track may not definitively indicate the presence of a road, for example if a vehicle or person carrying a location-enabled mobile device records a route that is purely off-road or is on a road that is only suitable for limited vehicle types, such as 4×4's or ATVs. Thus, some degree of validation of the recorded track is needed before categorizing it as a road within the road mapping database. Such validation represents a laborious task if carried out by humans.

In light of the foregoing, it is apparent that both image processing of aerial images, and the use of location technologies are able to help in the identification of road features for use in navigational databases. However, when used in isolation, each of these methods has some associated drawbacks: feature recognition using aerial images may be subject to classification errors and is computationally expensive, whilst the use of location technologies may have measurement error, limited spatial resolution and may not always represent routes that are on-road. Both approaches may require human validation to correct for these limitations, and this may incur associated time and financial cost overheads when constructing a navigational database.

The disclosures herein offer technical solutions to improve the identification and validation of roads unknown to a road mapping database. The systems and methods described utilize a combination of aerial image processing and location technologies to increase the accurate classification of a terranean feature as a road, and to capture additional information concerning the road that may be of interest to a user of a navigation platform. In embodiments, the systems and methods are described in the context of their application to the identification of private or leased roads within oilfield regions such that oilfield workers may benefit from improved and more efficient navigation in these areas. However, these embodiments serve as illustrative examples only and do not otherwise limit the scope of the disclosure to such use cases.

Further embodiments of the disclosure may extend the capabilities of an online platform for oilfield water management, or a platform for oilfield navigation, by providing functionality, within a server or a mobile device, to facilitate the identification and validation of roads unknown to a road mapping database, and to capture additional information concerning the road that may be of use to users of the platform.

For the purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods to identify and validate the routes and characteristics of roads unknown to a road mapping database.

A. Computing and Network Environment

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In a brief overview, the network environment may include one or more clients 102a-102n (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node(s) 106, machine(s) 106, or remote machine(s) 106), one or more online platforms 180a-180n (also generally referred to as online platforms(s) 180, platform node(s) 180, platform machine(s) 180, or remote online platform machine(s) 180), one or more information storages 150a-150n (also generally referred to as information storage(s) 150, record node(s) 150, record machine(s) 150, or remote record machine(s) 150), and one or more aerial image sources 101a-101n (also generally referred to as aerial information source(s) 101, image source(s) 101, image source machine(s) 101, or remote image source machine(s) 101) via one or more networks 104. In some embodiments, one or more of client 102, online platform 180, or information storage 150 has the capacity to function as both a node seeking access to resources provided by a server and as a server providing access to hosted resources for other clients 102a-102n, online platforms 180a-180n, and information storages 150a-150n. Examples of client(s) 102 includes user(s) 190 and subscriber(s) 195.

Although FIG. 1A shows a network 104 between clients 102, online platforms 180, information storage 150, aerial image source 101 and the servers 106, in examples clients 102, online platforms 180, information storage 150, aerial image source 101 and servers 106 may be on the same network 104. In some embodiments, there are multiple networks 104 between clients 102, online platforms 180, information storage 150, aerial image source 101 and the servers 106. In one of these embodiments, a network 104' (not shown) may be a private network and a network 104 may be a public network. In another of these embodiments, a network 104 may be a private network and a network 104' may be a public network. In still another of these embodiments, networks 104 and 104' may both be private networks. Servers 106 may be used to generically refer to all of online platforms 180, information storage 150, aerial image source 101, and servers 106. Clients 102, online platforms 180, and information storage 150 may process input from server 106 and/or may provide access as needed to various applications, modules, and other software components of server 106 to other various applications, modules, and other software components of server 106.

The network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1×RTT, CDMA-EVDO, LTE, LTE-Advanced, LTE-M1, and Narrowband IoT (NB-IoT). Wireless standards may use various channel access methods, e.g., FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network may vary widely and the network 104 can be a body area network (BAN), a personal area network (PAN), a local-area network (LAN), e.g., Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv4), or the link layer. The network 104 may be a type of broadcast network, a telecommunications network, a data communication network, or a computer network.

In some embodiments, the system may include multiple, logically-grouped servers 106. In one of these embodiments, the logical group of servers may be referred to as a server farm or a machine farm. In another of these embodiments, the servers 106 may be geographically dispersed. In other embodiments, a machine farm may be administered as a single entity. In still other embodiments, the machine farm includes a plurality of machine farms. The servers 106 within each machine farm can be heterogeneous—one or more of the servers 106 or machines 106 can operate according to one type of operating system platform (e.g., Windows, manufactured by Microsoft Corp. of Redmond, Washington), while one or more of the other servers 104 can operate according to another type of operating system platform (e.g., Unix, Linux, or Mac OSX).

In one embodiment, servers 106 in the machine farm may be stored in high-density rack systems, along with associated storage systems, and located in an enterprise data center. In this embodiment, consolidating the servers 106 in this way may improve system manageability, data security, the physical security of the system, and system performance by locating servers 106 and high-performance storage systems on localized high-performance networks. Centralizing the servers 106 and storage systems and coupling them with advanced system management tools allows more efficient use of server resources.

The servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 104 in the machine farm can be increased if the servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc. of Fort Lauderdale, Florida.; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, California.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106, online platform 180, information storage 150, and aerial image source 101 may be a file server, application server, web server, proxy server, appliance, network appliance, gateway, gateway server, virtualization server, deployment server, SSL VPN server, or firewall. In one embodiment, a plurality of servers 106, online platforms 180 information storages 150, and aerial image sources 101 may be in the path between any two communicating servers 106, online platforms 180 information storages 150, or aerial image sources 101.

Figure 1B:
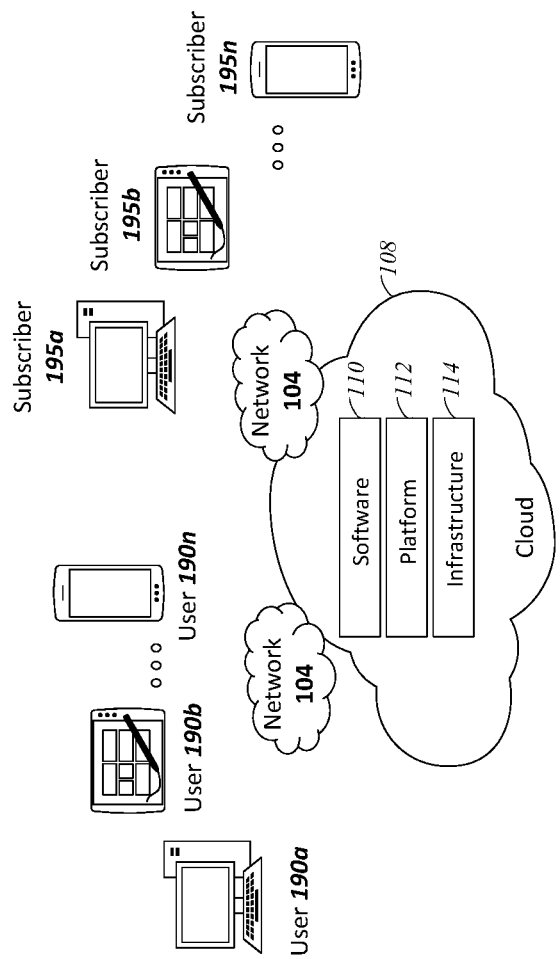
FIG. 1B is a block diagram depicting a cloud computing environment comprising client devices, for example user device and subscriber device, in communication with cloud service providers, according to some embodiments.

Referring to FIG. 1B, a cloud computing environment is depicted. A cloud computing environment may provide user 190 and subscriber 195 with one or more resources provided by a network environment. The cloud computing environment may include one or more users 190a-190n and one or more subscribers 195a-195n in communication with the cloud 108 over one or more networks 104. Users 190 and subscribers 195 may include, e.g., thick clients, thin clients, and zero clients. A thick client may provide at least some functionality even when disconnected from the cloud 108 or servers 106. A thin client or zero client may depend on the connection to the cloud 108 or server 106 to provide functionality. A zero client may depend on the cloud 108 or other networks 104 or servers 106 to retrieve operating system data for user 190 or subscriber 195. The cloud 108 may include back end platforms, e.g., servers 106, storage, server farms or data centers.

The cloud 108 may be public, private, or hybrid. Public clouds may include public servers 106 that are maintained by third parties to client(s) 102, for example user(s) 190 and subscriber(s) 195 or owners of client(s) 102, user(s) 190, and/or subscriber(s) 195. The servers 106 may be located off-site in remote geographical locations as disclosed above or otherwise. Public clouds may be connected to the servers 106 over a public network. Private clouds may include private servers 106 that are physically maintained by client(s) 102, for example user(s) 190 and/or subscriber(s) 195 or owners of client(s) 102, user(s) 190, and/or subscriber(s) 195. Private clouds may be connected to the servers 106 over a private network 104. Hybrid clouds may include both private and public networks 104 and servers 106.

Cloud 108 may also include a cloud-based delivery, e.g., Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers or virtualization resources from large pools, allowing the users to quickly scale up by accessing more resources as needed. Examples of IaaS include Amazon Web Services (AWS) provided by Amazon, Inc. of Seattle, Washington, Rackspace Cloud provided by Rackspace Inc. of San Antonio, Texas, Google Compute Engine provided by Google Inc. of Mountain View, California, or RightScale provided by RightScale, Inc. of Santa Barbara, California. PaaS providers may offer functionality provided by IaaS, including, e.g., storage, networking, servers or virtualization, as well as additional resources, e.g., the operating system, middleware, or runtime resources. Examples of PaaS include Windows Azure provided by Microsoft Corporation of Redmond, Washington, Google App Engine provided by Google Inc., and Heroku provided by Heroku, Inc. of San Francisco California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, California, or Office365 provided by Microsoft Corporation. Examples of SaaS may also include storage providers, e.g., Dropbox provided by Dropbox Inc. of San Francisco, California, Microsoft OneDrive provided by Microsoft Corporation, Google Drive provided by Google Inc., or Apple iCloud provided by Apple Inc. of Cupertino, California.

Client(s) 102, for example user(s) 190 and/or subscriber(s) 195 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Client(s) 102, for example user(s) 190 and/or subscriber(s) 195 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Client(s) 102, for example user(s) 190 and/or subscriber(s) 195 may access SaaS resources through the use of web-based user interfaces, provided by a web browser (e.g., Google Chrome, Microsoft Internet Explorer, or Mozilla Firefox provided by Mozilla Foundation of Mountain View, California). Client(s) 102, for example user(s) 190 and/or subscriber(s) 195 may also access SaaS resources through smartphone or tablet applications, including e.g., Salesforce Sales Cloud, or Google Drive App. Client(s) 102, for example user(s) 190 and/or subscriber(s) 195 may also access SaaS resources through the client operating system, including e.g., Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL). Client(s) 102, for example user(s) 190 and/or subscriber(s) 195 and server 106 may be deployed as and/or executed on any type and form of computing device, e.g., a computer, network device or appliance capable of communicating on any type and form of network and performing the operations described herein.

Figure 1C:
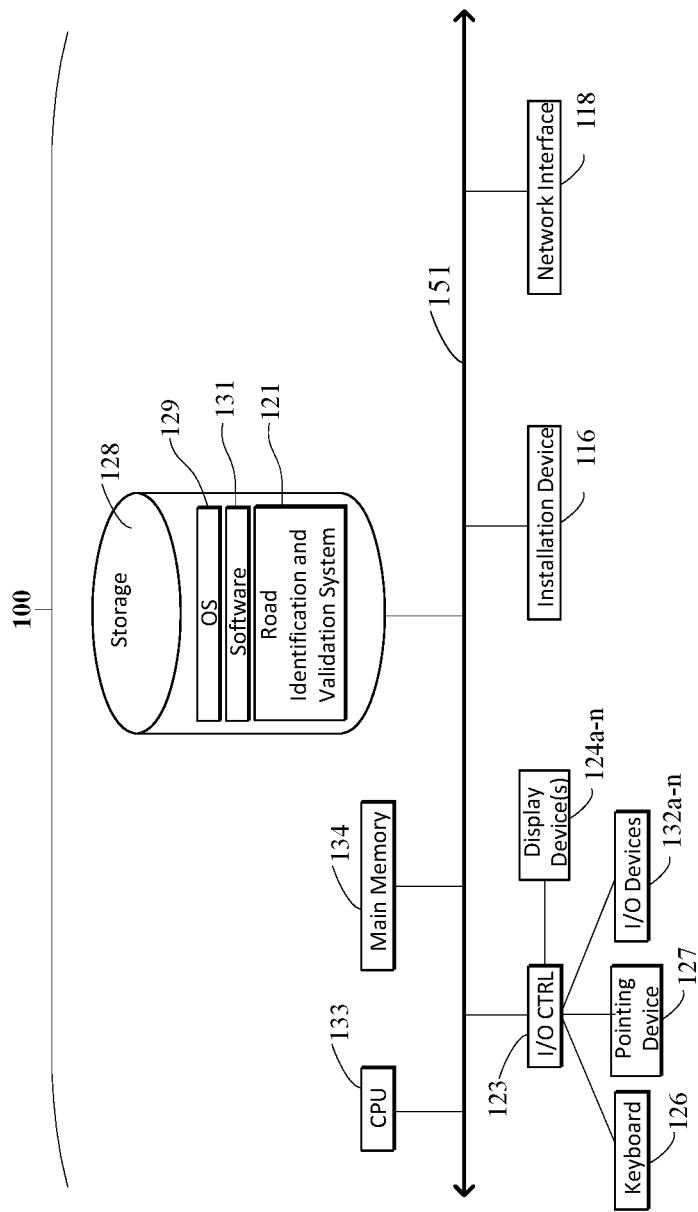
FIGS. 1C and 1D are block diagrams depicting embodiments of computing devices useful in connection with the methods and systems described herein.
Figure 1D:
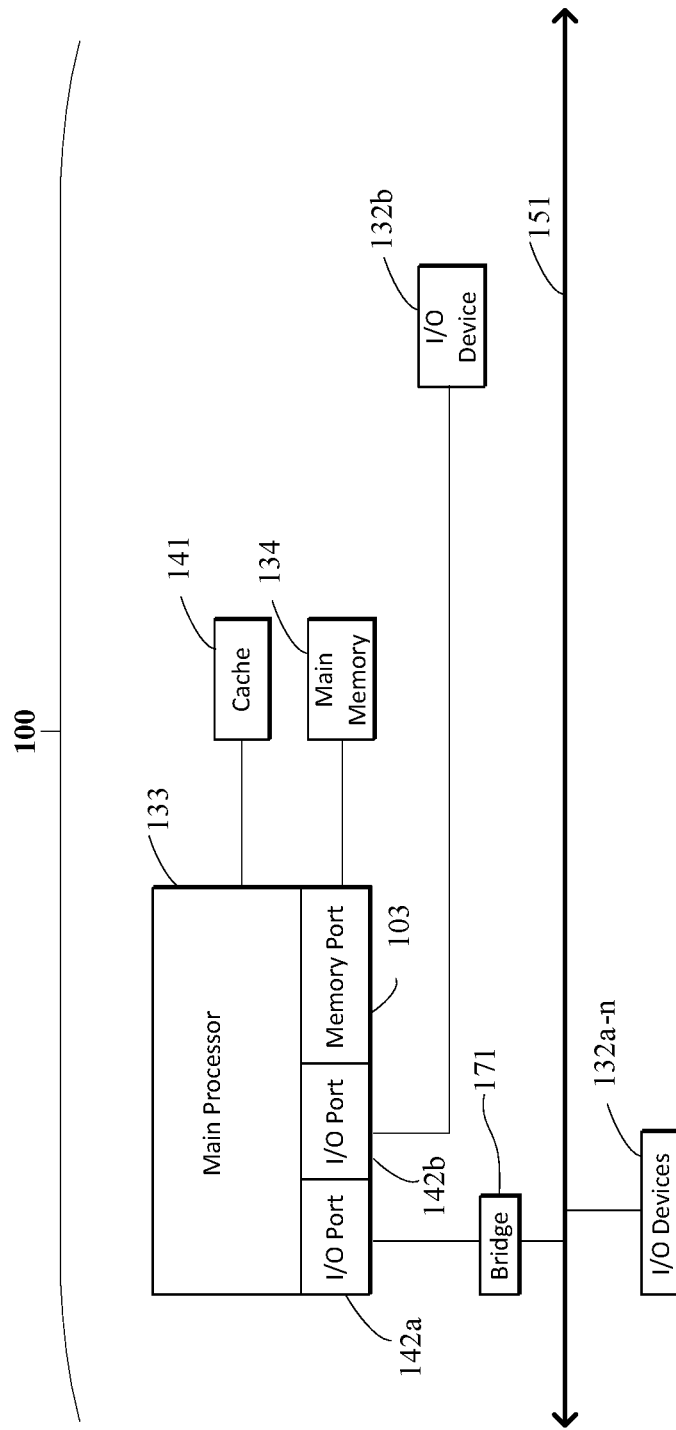

FIGS. 1C and 1D depict block diagrams of a computing device 100 useful for practicing an embodiment of the client 102, online platform 180, information storage 150, aerial image source 101 and the server 106. As shown in FIGS. 1C and 1D, each computing device 100 includes a central processing unit 133, and a main memory unit 134. As shown in FIG. 1C, a computing device 100 may include a storage device 128, an installation device 116, a network interface 118, an I/O controller 123, display devices 124a-124n, a keyboard 126 and a pointing device 127, e.g., a mouse. The storage device 128 may include, without limitation, an operating system 129, software 131, and a software of a road identification and validation system 121. As shown in FIG. 1D, each computing device 100 may also include additional optional elements, e.g., a memory port 103, a bridge 171, one or more input/output devices 132a-132n (generally referred to using reference numeral 132), and a cache memory 141 in communication with the central processing unit 133.

The central processing unit 133 is any logic circuity that responds to and processes instructions fetched from the main memory unit 134. In many embodiments, the central processing unit 133 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER4 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 133 may utilize instruction level parallelism, thread level parallelism, different levels of cache, and multi-core processors. A multi-core processor may include two or more processing units on a single computing component. Examples of multi-core processors include the AMD PHENOM IIX2, INTER CORE i5 and INTEL CORE i4.

Main memory unit 134 may include on or more memory chips capable of storing data and allowing any storage location to be directly accessed by the microprocessor 133. Main memory unit 134 may be volatile and faster than storage 128 memory. Main memory units 134 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 134 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 134 may be based on any of the above described memory chips, or any other available memory chips capable of operating as described herein. In the embodiment shown in FIG. 1C, the processor 133 communicates with main memory 134 via a system bus 151 (described in more detail below). FIG. 1D depicts an embodiment of a computing device 100 in which the processor communicates directly with main memory 134 via a memory port 103. For example, in FIG. 1D the main memory 134 may be DRDRAM.

FIG. 1D depicts an embodiment in which the main processor 133 communicates directly with cache memory 141 via a secondary bus, sometimes referred to as a backside bus. In other embodiments, the main processor 133 communicates with cache memory 141 using the system bus 151. Cache memory 141 typically has a faster response time than main memory 134 and is typically provided by SRAM, BSRAM, or EDRAM. In the embodiment shown in FIG. 1D, the processor 133 communicates with various I/O devices 132 via a local system bus 151. Various buses may be used to connect the central processing unit 133 to any of the I/O devices 132 including a PCI bus, a PCI-X bus, or a PCI-Express bus, or a NuBus. For embodiments in which the I/O device is a video display 124, the processor 133 may use an Advanced Graphic Port (AGP) to communicate with the display 124 or the I/O controller 123 for the display 124. FIG. 1D depicts an embodiment of a computer 100 in which the main processor 133 communicates directly with I/O device 132b or other processors 133' via HYPERTRANSPORT, RAPIDIO, or INFINIBAND communications technology. FIG. 1D also depicts an embodiment in which local busses and direct communication are mixed: the processor 133 communicates with I/O device 132a using a local interconnect bus while communicating with I/O device 132b directly.

A wide variety of I/O devices 132a-132n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 132a-132n may include a combination of multiple input or output (I/O) devices, including, e.g., Microsoft KINECT, Nintendo Wiimote for the WII, Nintendo WII U GAMEPAD, or Apple iPhone. Some I/O devices 132a-132n allow gesture recognition inputs through combining some of the inputs and outputs. Some I/O devices 132a-132n provide for facial recognition which may be utilized as an input for different purposes including authentication and other commands. Some I/O devices 132a-132n provide for voice recognition and inputs, including, e.g., Microsoft KINECT, SIRI for iPhone by Apple, Google Now or Google Voice Search, and Alexa by Amazon. Additional I/O devices 132a-132n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 132a-132n, display devices 124a-124n or group of devices may be augmented reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation device 116 for the computing device 100. In still other embodiments, the computing device 100 may provide USB connections (not shown) to receive handheld USB storage devices. In further embodiments, an I/O device 132 may be a bridge between the system bus 151 and an external communication bus, e.g., a USB bus, a SCSI bus, a FireWire bus, an Ethernet bus, a Gigabit Ethernet bus, a Fiber Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 132a-132n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments, software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g., one or more hard disk drives or redundant arrays of independent disks) for storing an operating system or other related software, and for storing application software programs such as any program related to the feature recognition system software 121. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 151. Some storage device 128 may be external and connect to the computing device 100 via an I/O device 132 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. Additionally, the operating system and the software can be run from a bootable medium, for example, a bootable CD, e.g., KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In one embodiment, the computing device 100 communicates with other computing devices 100' via any type and/or form of gateway or tunneling protocol e.g., Secure Socket Layer (SSL) or Transport Layer Security (TLS), or the Citrix Gateway Protocol manufactured by Citrix Systems, Inc. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1C and 1D may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 4, WINDOWS RT, WINDOWS 8 and WINDOW 10, all of which are manufactured by Microsoft Corporation of Redmond, Washington; MAC OS and iOS, manufactured by Apple, Inc.; and Linux, a freely-available operating system, e.g., Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, or a NINTENDO DS, NINTENDO 3DS, NINTENDO WII, or a NINTENDO WII U device manufactured by Nintendo Co., Ltd., of Kyoto, Japan, or an XBOX 340 device manufactured by Microsoft Corporation.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M9A/AAC, WMA Protected AAC, AIFF, Audible audiobook, Apple Lossless audio file formats and .mov, .m4v, and .mp4 MPEG-4 (H.244/MPEG-4 AVC) video file formats.

In some embodiments, the computing device 100 is a tablet e.g., the IPAD line of devices by Apple; GALAXY TAB family of devices by Samsung; or KINDLE FIRE, byAmazon.com, Inc. of Seattle, Washington. In other embodiments, the computing device 100 is an eBook reader, e.g., the KINDLE family of devices by Amazon.com, or NOOK family of devices by Barnes & Noble, Inc. of New York City, New York.

In some embodiments, client 102 includes a combination of devices, e.g., a smartphone combined with a digital audio player or portable media player. For example, one of these embodiments is a smartphone, e.g., the iPhone family of smartphones manufactured by Apple, Inc.; a Samsung GALAXY family of smartphones manufactured by Samsung, Inc; or a Motorola DROID family of smartphones. In yet another embodiment, client 102 is a laptop or desktop computer equipped with a web browser and a microphone and speaker system, e.g., a telephony headset. In these embodiments, the client(s) 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Main Description

The following describes systems and methods that are useful for identifying and validating the routes and characteristics of roads unknown to a road mapping database. Details of the disclosed systems and methods are provided by means of the accompanying figures and description as follows.

Figure 2:
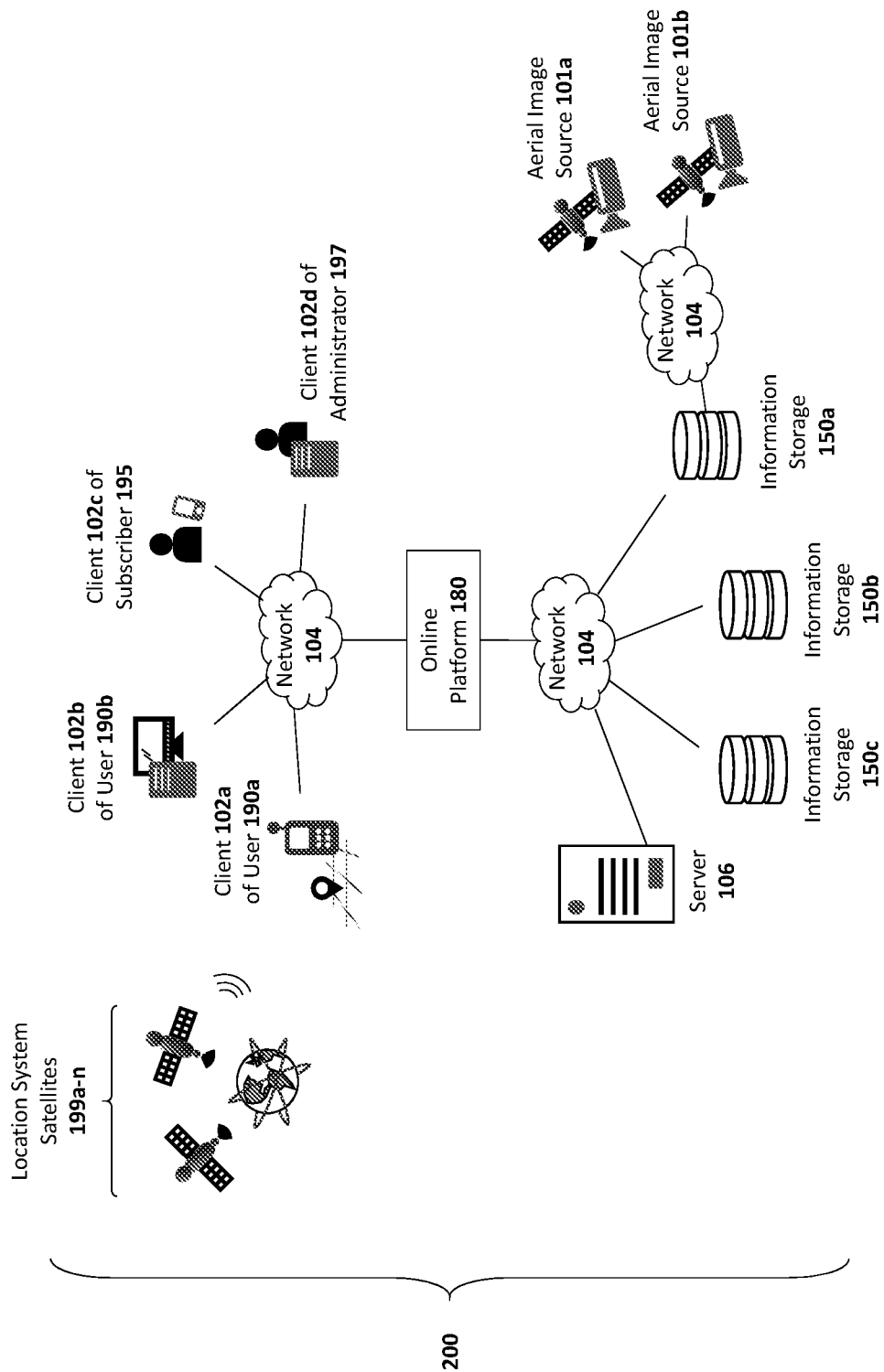
FIG. 2 shows a system suitable for identifying and validating roads unknown to a road mapping database, according to some embodiments.

In a general overview, FIG. 2 shows a system 200 suitable for identifying and validating roads unknown to a road mapping database, according to some embodiments Referring to FIG. 2 in more detail, system 200 may comprise one or more servers 106, one or more information storages 150a, 150b and 150c, one or more aerial image sources 101a and 101b, one or more online platforms 180, one or more location system satellites 199a-n and one or more clients 102a, 102b, 102c and 102d operated by users 190a and 190b, subscribers 195 or administrators 197.

Any of server 106, information storages 150, online platform 180, aerial image sources 101, location system satellites 199 and clients 102 of users 190, subscribers 195 and administrators 197 may be connected to one another. Depending on the application or environment, the connection may be achieved via wired or wireless means, and such a connection may be either direct or may traverse a network 104. For ease of illustration, example connections of FIG. 2 are shown traversing a network 104 though such a network need not be present and may be replaced with a direct connection or no connection at all.

Any of client devices 102a-n may be location enabled such that they are able to determine their own location using a suitable location technology. Suitable location technologies may include satellite-based technologies such as, but not limited to, the Global Positioning System (GPS), Globalnaya Navigatsionnaya Sputnikovaya Sistema or GLObal NAvigation Satellite System (GLONASS), Galileo, or BeiDou. Alternatively, terrestrial-based or cellular radio location technologies may be employed by client devices 102a-n. Clients 102 may be capable of reporting their current location, or a stored history of previous locations to online platform 180 or server 106 via one or more networks 104. Clients 102 that are location enabled and which utilize a satellite-based location technology are capable of receiving radio signals transmitted by one or more location system satellites 199a-n and of processing the radio signals to determine a location of the client 102.

Online platform 180, server 106, or network 104 may also be capable of determining the location of a client 102, even if client 102 is not location enabled. In such cases, online platform 180, server 106 or network 104 may utilize a network address to resolve the location of, for example, a wired client 102, or may process received radiocommunication signals to resolve the location of, for example, a wireless client 102. The processing of the radiocommunication signals may be based on any suitable method, including, but not limited to, a time-of-arrival (ToA) based analysis or a Direction of Arrival (DoA) based analysis.

In examples, online platform 180 may comprise an oilfield water platform in which users 190 and subscribers 195 may advertise or exchange information related to an availability-of or need-for oilfield water or other associated oilfield resources, services, or infrastructure. Alternatively, or in combination, online platform 180 may comprise a navigation platform to assist oilfield workers (such as users 190 and subscribers 195 of the online platform) to route-to and locate oilfield sites, facilities and properties. Such purposes and uses of online platform 180 serve as illustrative examples only and do not limit application of the described systems and methods to other types of online platform 180.

Server 106 or online platform 180 may communicate with information storages 150a, 150b or 150c either directly, or via a network 104. Information may be written to or retrieved from any of information storages 150a, 150b and 150c. Information storages 150a-c may possess certain other attributes or characteristics. For example, any of information sources 150a-c may be privately or publicly owned or may be local or remote to server 106. Further example characteristics of information sources 105a-150c may be that the information they comprise is freely or publicly accessible or has restricted access for example only to users of a specific entity, or group. Yet further characteristics of information sources 150a-c may be that the information they comprise is available with or without a financial cost or subscription. It shall be appreciated that such characteristics are exemplars only and do not limit the scope of the description and other equivalent or similar information sources may be equally suitable for use within system 200.

In examples, information storage 150a may be an aerial image storage unit or server capable of storing aerial images captured by one or more aerial image sources 101a and 101b and relayed to information storage 150a via a network 104. Aerial image sources 101a and 101b may be a camera onboard a satellite or any other suitable overhead imaging device. Aerial image sources 101a and 101b may capture visible light or may be capable of forming images through sensing any other range of the electromagnetic spectrum.

In examples, information storage 150b may be a public records information source comprising information on land ownership status. In some embodiments, information storage 150b may contain information regarding whether areas of land are designated as publicly owned, or privately owned.

In examples, information storage 150c may comprise road mapping or navigational information, such as known road network data, or the locations and properties of known points of interest (POI's).

Embodiments of system 200 may include functionality to facilitate the identification and validation of roads unknown to a road mapping database. Such functionality may comprise a road identification and validation manager 350 component located within server 106 or online platform 180 and which may communicate with a client application component located within client 102.

In examples of system 200, the configuration and maintenance of server 106, online platform 180, information storages 150a-c, clients 102a-c or aerial image sources 101a and 101b may be controlled by administrator 197 who may access or control these either directly or via a network 104. Operations that may be performed by administrator 197 may include for example, the updating of software or firmware used by any component of the server 106, the clients 102, the online platform 180, the information storages 150, the networks 104 or the aerial image sources 101. Further administrative operations may include the configuring, receiving or processing of diagnostic reports or logs, the configuring of parameters, variables, or thresholds used by any component of the system, the reading or writing of data from storages and the configuring of networks.

Figure 3A:
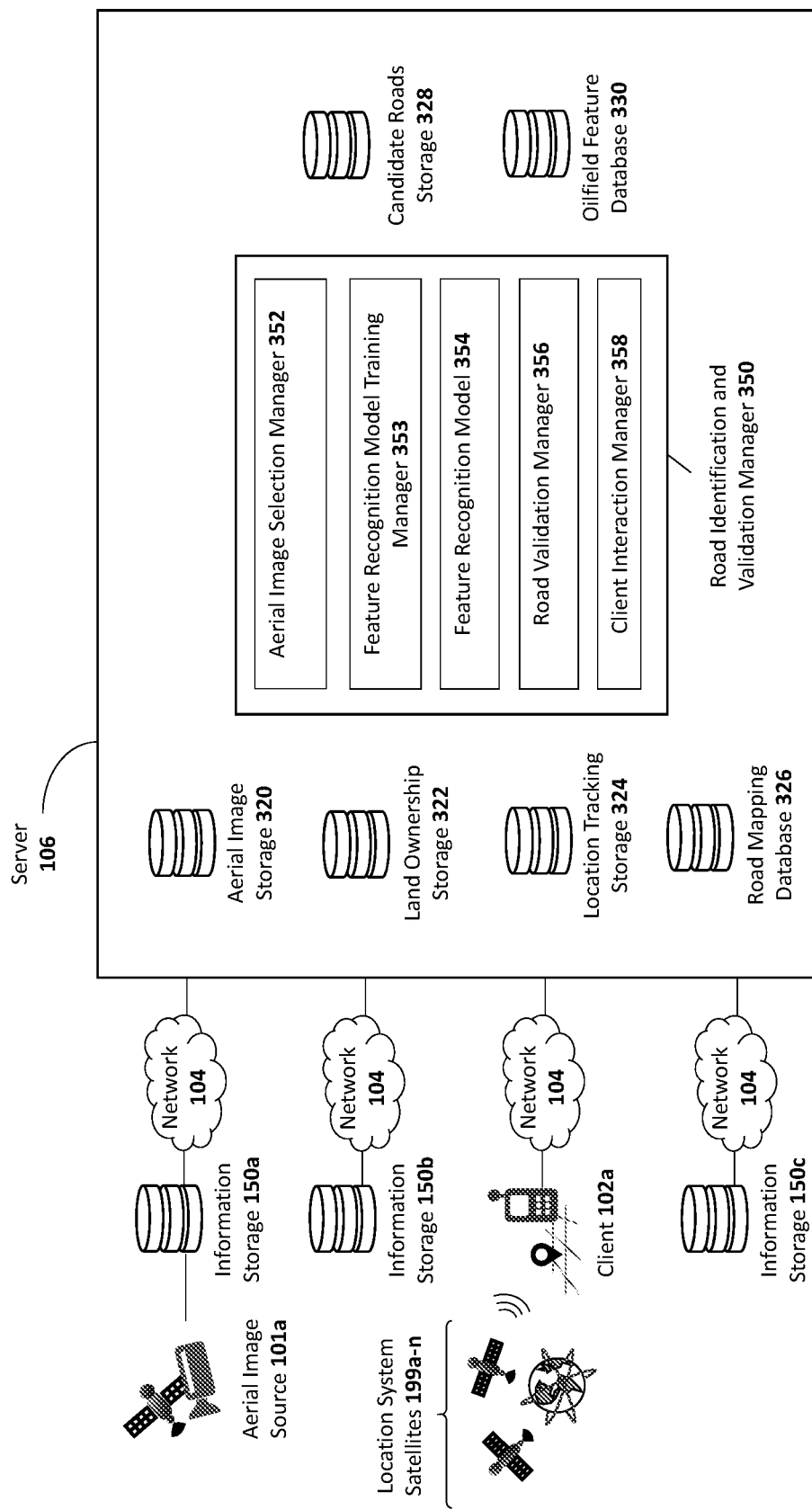
FIG. 3A shows a server in connection with other components of a road identification and validation system, according to some embodiments.

FIG. 3A shows a server 106 in connection with other components of a road identification and validation system including information storages 150a-c, aerial image source 101a, client 102a, and location system satellites 199a-n, according to some embodiments. Referring to FIG. 3A in more detail, server 106 may include a road identification and validation manager 350 in addition to internal storages such as aerial image storage 320, land ownership storage 322, location tracking storage 324, road mapping database 326, candidate roads storage 328 and oilfield feature database 330. Internal storages 320, 322, 324, 326, 328 and 330 may facilitate the storage, exchange and communication of information or data with components internal to or external to server 106. By means of example, aerial image storage 320 may facilitate local storage, within server 106, of aerial images retrieved from information storage 150a which in-turn, is connected to aerial source 101a. As further examples, land ownership storage 322 may facilitate local storage of land ownership information sourced from information storage 150b that is external to server 106, and location tracking storage 324 may facilitate local storage of location tracking information transmitted to server 106 by client 102*a*. Similarly, road mapping database 326 may facilitate local storage, within server 106, of road mapping information, some, none or all of which may be sourced from external information storage 150*c* whilst oilfield feature database 330 may facilitate local storage of information regarding the locations, types or statuses of known oilfield sites or features, some, none or all of which may be sourced from an external information storage 150*n* (not shown). In general, server 106 may be connected to any other external information storages, such as 150*d*, 150*e*, 150*f*, and so forth (also not shown), these comprising any other information of use in facilitating the operation of road identification manager 350.

Figure 3B:
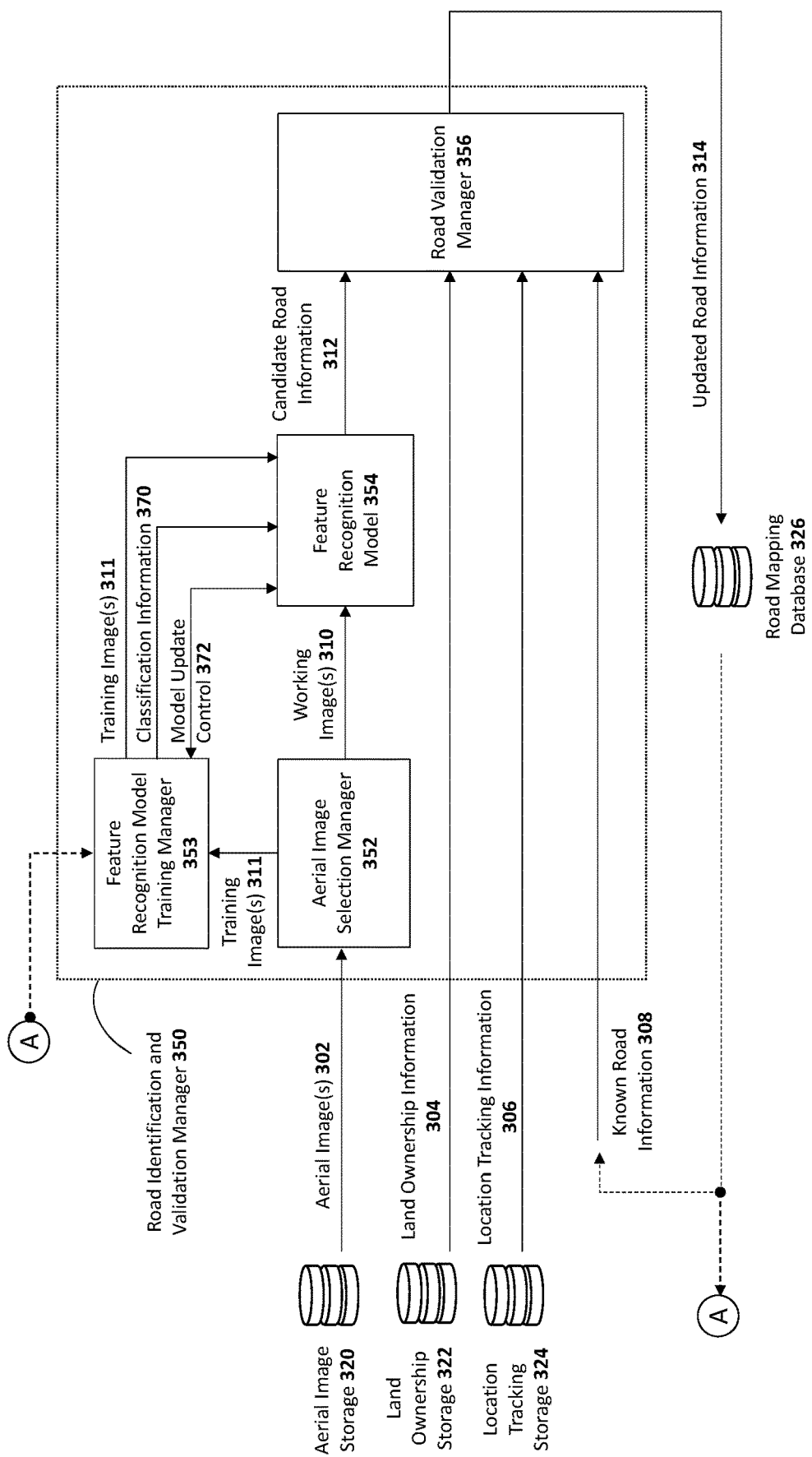
FIG. 3B illustrates an example configuration of a server of a road identification and validation system according to some embodiments.
Figure 3C:
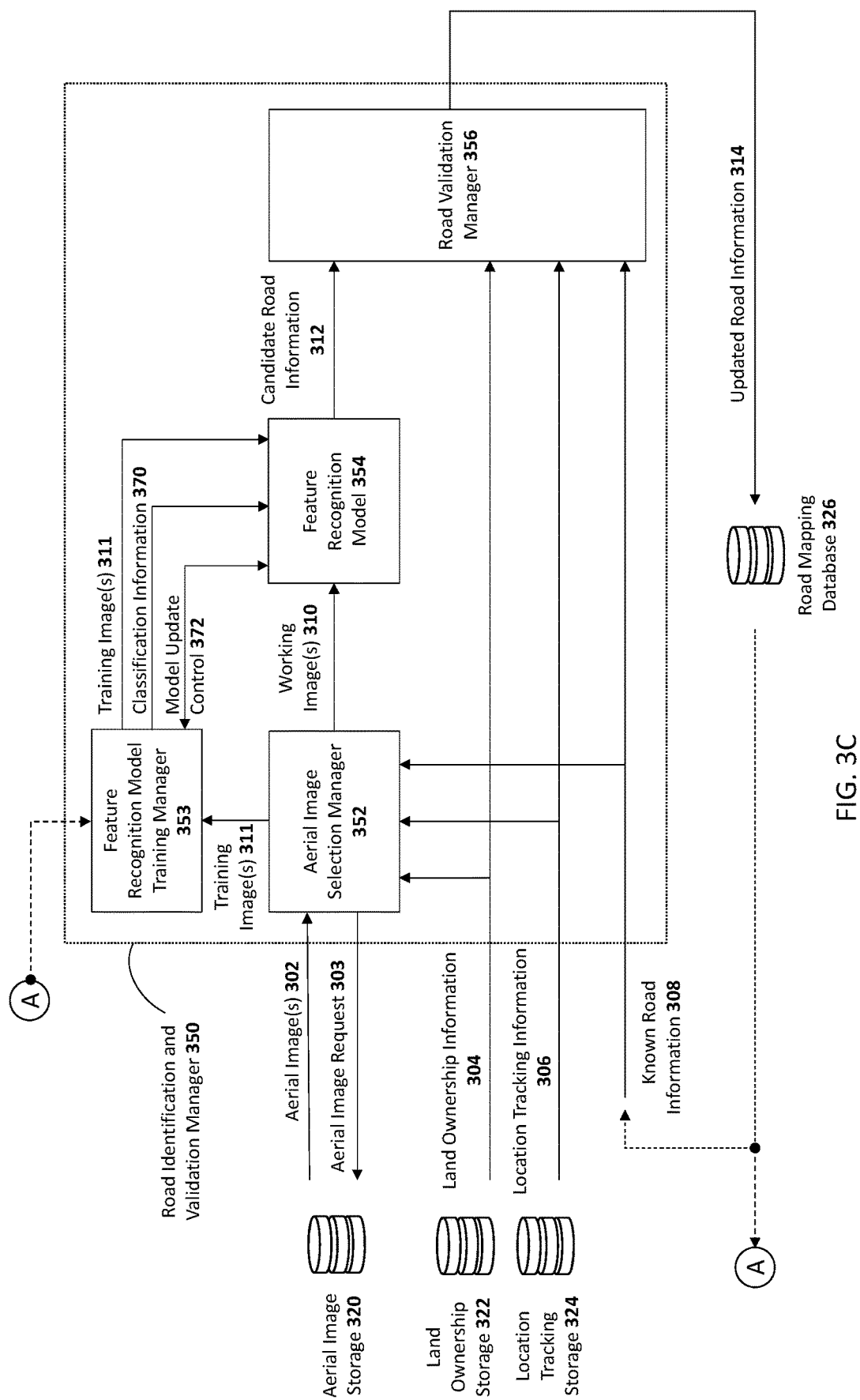
FIG. 3C illustrates a further example configuration of a server of a road identification and validation system according to some embodiments.
Figure 5:
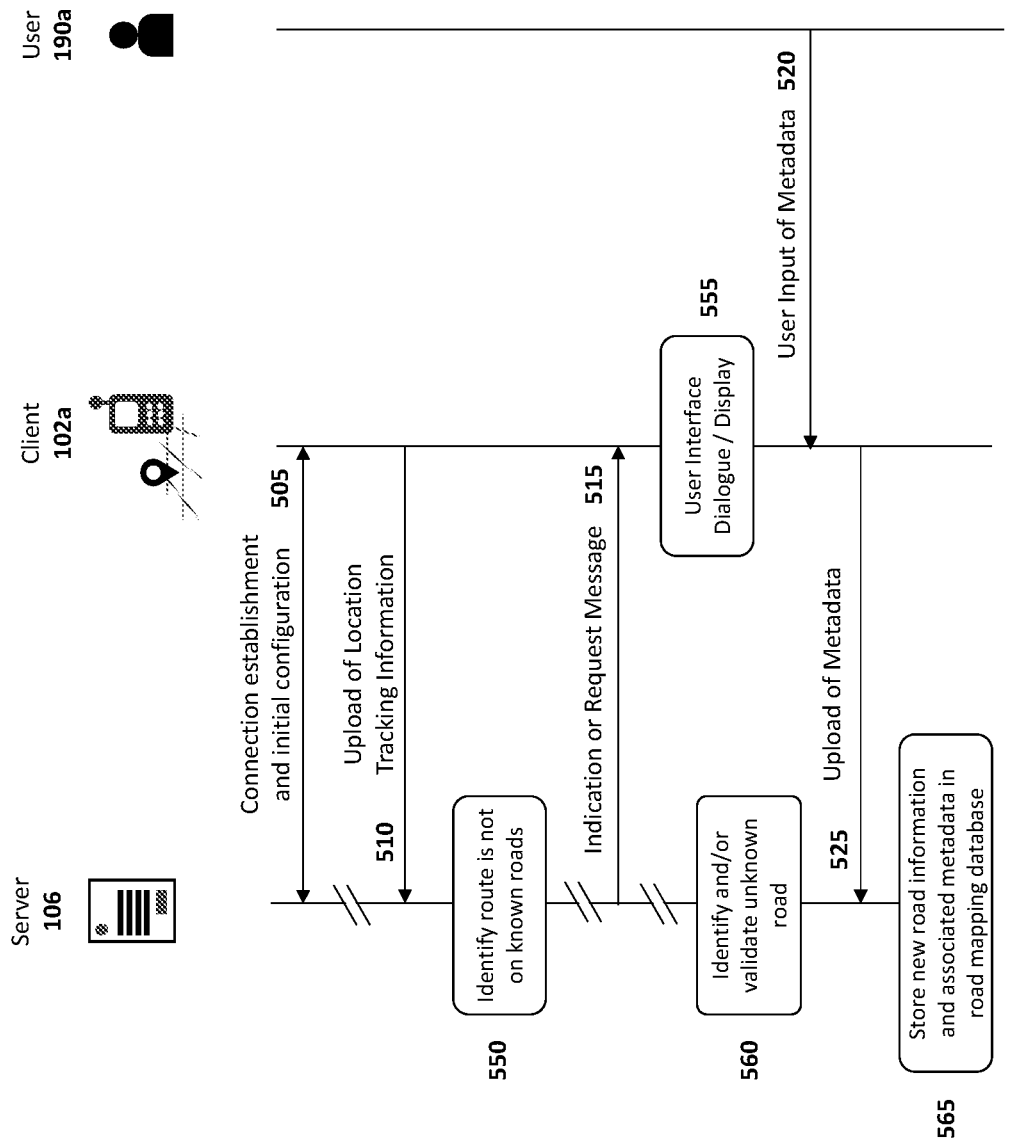
FIG. 5 illustrates an example of interactions between a server, a client and a user of a road identification and validation system, according to some embodiments.

Road identification manager 350 may comprise additional constituent components, such as an aerial image selection manager 352, a feature recognition model 354, a feature recognition model training manager 353, a road validation manager 356, and a client interaction manager 358, further description of which may be found with reference to FIGS. 3B, 3C and 5 and the accompanying descriptions thereof. Referring again to FIG. 3A, server 106 may receive one or more informational inputs including, for example, aerial images (from aerial image source 101*a* and information storage 150*a*), land ownership information (from information storage 150*b*), location tracking information (from a location-enabled client 102*a*, or from a location-enabled network 104 to which client 102*a* is connected), and road mapping information (from information storage 150*c*). These information inputs may optionally be stored locally within server 106, for example in internal storages 320, 322, 324, or 326 respectively. Whether stored locally or not, the informational inputs to server 106 may be subsequently provided to road identification manager 350 for further processing.

In addition to receiving information from components of system 200 that are external to server 106, server 106 may also communicate or write information to such external components. By means of example, as a result of its operation, road identification and validation manager 350 of server 106 may determine updated road mapping information that may not only be written to internal road mapping database 326, but which may also be communicated externally, such as to information storage 150*c*, to client 102 such as client 102*a*, to another server 106, or to an online platform 180.

FIG. 3B illustrates an example configuration of a server 106 of a road identification and validation system 200 according to some embodiments. Server 106 may comprise a road identification and validation manager 350, which may in-turn comprise an aerial image selection manager 352, a feature recognition model 354, a feature recognition model training manager 353 and a road validation manager 356. Road identification and validation manager 350 may receive informational inputs such as one or more aerial images 302, land ownership information 304, location tracking information 306, and known road information 308. In examples, the aerial images 302, the land ownership information 304, and the location tracking information 306 may be sourced from aerial image storage 320, land ownership storage 322 and location tracking storage 324 respectively. The known road information 308 may be sourced from a road mapping database 326.

As a result of its operation, road identification and validation manager 350 may determine updated road information 314 that may be communicated to road mapping database 326 in order to update it. By means of example, the updated road information 314 may contain the route or characteristics of a newly identified private or leased road within an oilfield region. Once determined and stored in road mapping database 326, the updated road mapping information may then be used in a subsequent operation as known road information 308 by road identification and validation manager.

In operation, aerial image selection manager 352 may be configured to select one or more of the aerial images 302 that are available from or retrieved from aerial image storage 320. Selected aerial images may be either training images 311 or working images 310. Training images 311 are aerial images in which certain features are known to be present and have been correctly classified a-priori (that is, before application of the training image to the feature recognition model 354). Conversely, working images 310 are aerial images in which such an a-priori identification or classification of a feature is not available, hence it is then the task of the feature recognition model 354 to process the working image(s) 310 to identify the presence or classification of a terrain feature, such as a road.

Thus, feature recognition model 354 may be operated either in a training mode, or in a working mode. In training mode, feature recognition model 354 may be supplied with one or more training images 311 (for example, from aerial image selection manager 352) and with classification information 370 that may be known a-priori. For example, a first training image 311*a* may contain an image of a known road, hence this may be supplied to feature recognition model 354 along with the coordinates of the known road within the classification information 370. Continuing the example, a second training image 311*b* may contain an image without roads, but with a river, and this may be supplied to feature recognition model 354 along with an indication within classification information 370 that no roads are present within the image.

In some examples, the classification information 370 may be determined via human analysis of training images 311 and may be stored-in or uploaded-to feature recognition model training manager 353 for example by an administrator 197 of system 200. In other examples, the classification information 370 may be determined using known road information 308 stored within road mapping database 326 and which is passed (via the interconnect points labelled "A" in FIGS. 3B and 3C) to feature recognition model training manager 353. Due to the fact that road mapping database 326 contains accurate and validated information regarding the routes, characteristics and interconnectivity of known roads and other terrain features or points of navigational interest, and because this information is not solely derived by feature recognition model 354, this may be used by feature recognition model training manager 353 to determine classification information 370 for the purposes of training feature recognition model 354. In order to do so, feature recognition model training manager 353 may select (for example, in communication with aerial image selection manager 352) appropriate training images 311 covering a geographical area in which a road is known to exist. In the training mode of operation, these selected training images 311 may then be passed to feature recognition model 354 along with the appropriate classification information 370 that is derived from the known road information 308 stored within road mapping database 326. In this way, the system is able to autonomously improve the accuracy of feature recognition model 354 via a training process that uses its own validated road information. In doing so, feature recognition model training manager 353 may communicate with aerial image selection manager 352 in order to assist with the selection of suitable images 311 for training purposes.

Feature recognition model 354 may be an application, service, daemon, routine, or other executable logic for applying artificial intelligence and/or machine learning to analyze an aerial image to identify or classify features within terrain depicted therein. In some embodiments, feature recognition model 354 may include a convolutional neural network (CNN). The CNN may include a plurality of neurons, each of which may operate on a set of inputs x (for example from other neurons) to produce an output y. In one example, the output y may include the calculation by the neuron of a weighted sum of inputs x plus a bias variable b, such that y is a function of z=w.x+b. Here, x and w are multi-element vectors representing the inputs and weights respectively, whilst z, y and b may, in some examples, be single-element real or complex values. Calculation of y may further include an activation function, such as for example a Sigmoid function, and which may be operable on z such that $y=1/(1+e^{-z})$. Numerous other known activation functions and basic calculations may be employed by neurons within a CNN-based image recognition model. Feature recognition model 354 may further include multiple layers, each layer comprising a group of neurons that may be connected to a group of neurons in a previous and/or subsequent layer. Such layers may comprise an input layer, one or more hidden layers, and an output layer. In examples, image data is passed to the input layer, where it is processed by the group of neurons associated with the input layer, and the outputs thereby generated are passed to the first of the hidden layers. Each successive hidden layer may process the set of inputs received from the previous layer in order to calculate a set of outputs to pass to the next layer. The last hidden layer may calculate a set of outputs to pass to the output layer. The output layer may calculate an output using the received set of inputs from the last hidden layer. In examples, the neurons in each layer may each perform a similar type of mathematical operation, for example, to perform a convolution function within a convolutional layer, or a pooling (down-sampling) function within a pooling layer. Numerous other layer types are known in which different mathematical functions related to image-processing may be used. A neuron in a layer may be connected to one or more neurons of the previous layer and to one or more neurons of a subsequent layer. At each neuron, each input connection may be associated with a weight, for example an element of a weight vector w. The weights w may be adjusted in order to adapt or tune the model to a specific image recognition task or function.

During the training mode of operation, feature recognition model training manager 353 may modify feature recognition model 354 via an exchange of information therebetween (shown in FIG. 3B as model update control 372) such that an error of the model (for example a mathematical difference between a derived classification of a feature and an actual or true classification) is reduced. Modification of feature recognition model 354 may include an update to a structure, weights, coefficients, parameters, variables, thresholds or probabilities associated with a neural network within the model. In some examples, such weights and parameters may include the weights w associated with inputs to neurons within the model or the neuron bias variables b. These may be recursively updated within feature recognition model 354 to reduce an error at the model output and to thereby improve its recognition performance for subsequent use in a working mode of operation. In the working mode, feature recognition model 354 may be applied to working images 310 to identify or classify one or more terrain features within the image, or to determine that no such features are present.

However so achieved, feature recognition model 354 is trained to associate image content in a training image 311 with terrain features and terrain feature types known to be present within the training image. The image content may comprise pixel values (e.g., color, hue, intensity, saturation, etc.) or other image-based informational content encoded or otherwise represented within the training image. In the working mode of operation, the feature recognition model 354 may then be applied to one or more working images 310 to identify or classify terrain features and feature types within the working image. In some examples, feature recognition model 354 is configured to provide a surety or confidence level associated with an identification or a classification of a feature. For example, a confidence level at an output of the model may indicate a percentage confidence that an identification or classification is correct.

In embodiments, feature recognition model training manager 353 may be configured to train one or more feature recognition models 354a, 354b . . . 354n, each specialized or adapted to identify or classify a terrain feature of a given type. For example, a first feature recognition model 354a may be trained to identify roads whereas a second feature recognition model 354b may be trained to identify oilfield well sites. Alternatively, first and second feature recognition models 354a and 354b may be trained to identify major roads (for example freeways) and minor roads (for example private or leased roads) respectively. Information regarding features identified or classified by feature recognition model 354 may be passed to other components of server 106 (such as to road validation manager 356) or stored (such as in candidate roads storage 328 or oilfield feature database 330).

Artificial intelligence models may be of a variety of types, for example linear regression models, logistic regression models, linear discriminant analysis models, decision tree models, naïve bayes models, K-nearest neighbors models, learning vector quantization models, support vector machines, bagging and random forest models, and deep neural networks. In general, all AI models aim to learn a function which provides the most precise correlation between input values (X) and output values (Y):

$$Y=f(X)$$

In general, feature recognition model training manager 353 trains one or more feature recognition models 354a, 354b . . . 354n using historic sets of inputs (X) and outputs (Y) that are known to be correlated. For example, in a linear regression AI model represented by the expression:

$$Y=B_0 \times B_1 X$$

A set of n historical data points (Xi,Yi) are used to estimate the values for $B_0$ and $B_1$, for example:

$$B_1 = \frac{\sum_{i=1}^{n}((X_i - \bar{X}_i) \times (Y_i - \bar{Y}_i))}{\sum_{i=1}^{n}(X_i - \bar{X}_i)^2}$$

$$B_0 = \bar{Y}_i - B_1(\bar{X}_i)$$

Parameters $B_0$ and $B_1$ may be considered coefficients of the AI model. The model with these initial coefficients is then used to predict the output of the model $Y_{i,M}$ given the set of historic inputs $X_i$. Thus, $Y_{i,M}$ corresponds to a derived output of the model given $X_i$, and may differ to a known (or "correct") output for input $X_i$. The error of these predictions may be calculated using Root Mean Square Error (RMSE), for example:

$$RMSE = \sqrt{\sum_{i=1}^{n} \frac{(Y_{i,M} - Y_i)^2}{n}}$$

Feature recognition model training manager 353 then adjusts the coefficients $B_0$ and $B_1$ to minimize the RMSE over multiple historical data sets $(X_i, Y_i)$. Different types of AI models use different techniques to adjust the weights (or values) of various coefficients, in general by using historical data sets that are correlated in the way that the model is trying to predict in new data sets by minimizing the predicted error of the model when applied to the historical data sets.

Feature recognition model training manager 353 may be an application, service, daemon, routine, or other executable logic for creating, training, and/or updating feature recognition models.

In the working mode of operation, working images 310 are selected by aerial image selection manager 352 and passed to feature recognition model 354. In one example corresponding to FIG. 3B, the selection of images by image selection manager 352 may be made on a geographical basis. Thus, in embodiments, the system may be tasked to analyze images for a region of interest, such as a state or a county, and is therefore configured to select one or more corresponding working images 310. Alternatively, an administrator 197 of the system may configure or specify a particular image or set of working images 310 to be processed.

In examples, feature recognition model 354 may be configured to process the working images 310 to identify or classify features that resemble roads. Information corresponding to the identified features is herein termed candidate road information 312, and may comprise for example, a confidence level that a feature is a road along with geographical coordinates that lie along or otherwise define the route of the candidate road. The term "candidate" is used to denote that the identification or classification of a feature as a road may, at this stage, not be known with 100% certainty. For example, feature recognition model 354 may indicate a confidence level of only 50% in candidate road information 312. It is then the role of road validation manager 356 to improve this confidence level, if possible, using additional information as shall be further described in detail below. Candidate road information 312 may either be passed directly from feature recognition model 354 to road validation manager 356 or may be stored in candidate road storage 328 for later retrieval by, for example, road validation manager 356.

The foregoing has described examples of how feature recognition model 354 may operate (in cooperation with aerial image selection manager 352 and feature recognition model training manager 353) to determine candidate road information 312 using aerial images 302 from aerial image storage 320. As shown in FIG. 3B, additional informational inputs to road identification and validation manager 350 may also be present, such as land ownership information 304, location tracking information 306 and known road information 308. In examples, these inputs may be passed to road validation manager 356 to improve the accuracy, reliability and utility of road identification by system 200.

In examples, a primary purpose of the system may be to identify and record only private or leased roads. In some embodiments therefore, road validation manager 356 may use land ownership information 304 to determine whether candidate roads (as defined within candidate road information 312) lie on privately-owned or publicly-owned land, and road mapping database 326 may only be updated with any new road information 314 in the event that the candidate road is on private land. The land ownership information 304 may include a series of geographical coordinates that define boundaries between private and public land, or which mark the centers of land segments (for example 100 m×100 m square regions of land), each of which may be categorized as either publicly or privately owned. Alternatively, land ownership information 304 may be a public record of actual land rights and ownership which must then be parsed or interpreted by road validation manager 356 to determine a private or public designation for a particular geographical region or land segment through which a candidate road passes. Thus, road validation manager 356 may analyze the geographical coordinates defining the route of a candidate road (within candidate road information 312) and may determine corresponding private or public ownership designations using land ownership information 304. In some examples, sections of candidate road that lie on publicly-owned land may be discarded by the system as they do not meet the criteria of a private or leased road. In other examples, a candidate road may be added to road mapping database 326 (via updated road information 314) so long as at least one segment of the road lies on private land.

In other examples, road validation manager 356 may use known road information 308 (for example, comprising the coordinates of known roads) to determine whether a candidate road (defined within candidate road information 312) is already recorded in road mapping database 326 and is therefore not new. In such cases, system 200 may be configured to discard the candidate road information and not to record the candidate road within road database 326. In this way, road validation manager 356 may act as a filter for candidate road information 312, only allowing the candidate road to be recorded in road mapping database 326 when it does not align geographically with any existing known roads.

Road validation manager 356 may also receive location tracking information 306 which may comprise a plurality of recorded geographical locations of one or more client devices 102, for example, a series of locations defining a driven route or journey of a client. Such information may be used by system 200 to confirm (or increase a confidence level in) the actual presence or a road along the route defined within candidate road information 312. By means of example, feature recognition model 354 may initially determine the presence of a candidate (but narrow and unpaved) road with a low certainty of only 30% due to the fact that the corresponding feature in the aerial image is difficult to discern and is not dissimilar to a watercourse feature. However, road validation manager 356 may later receive location tracking information 306 indicative of one or more clients 102 moving along a similar path (for example, one with a good spatial match) to the route of the candidate road. Optionally, road validation manager 356 may also determine that the client is (or was) moving at a vehicular speed (for example, a speed that that exceeds a threshold indicative of a maximum pedestrian speed) over that same section of its route. As a result, road validation manager may determine with high certainty that the candidate feature identified by feature recognition model 354 is indeed a road and may therefore record the presence of the road by providing updated road information 314 to road mapping database 326. If the system is configured to only record private or leased roads, road validation manager 356 may additionally verify that the road is on private land using land ownership information 304 (as previously described), before recording the road in road mapping database 326. The system may also be configured to verify that a candidate road does not correspond to roads already known to road mapping database 326 prior to recording the presence of a new road in the database. To do so, road validation manager 356 may, in examples, determine whether there is a spatial match between the candidate road information 312 and known road information 308. In further examples, the system may be configured to verify that a route (or portion thereof) traveled by a client (as comprised within location tracking information 306) does not align with the routes of roads known to road mapping database 326, before recording the presence of a candidate road. To do so, road validation manager 356 may, in examples, determine whether there is an absence of a spatial match between the location tracking information 306 and known road information 308 (that is, at least a portion of a route traveled by a client does not align with the routes of roads known to road mapping database 326). Thus, road validation manager 356 may perform one or more checks, comparisons or verification steps on the information it receives to improve the accuracy of information stored within road mapping database 326. In examples, such verification steps may include (amongst others) one or more of i) determining whether there is a spatial match (or absence thereof) between candidate road information 312 and location tracking information 306, ii) determining whether there is a spatial match (or absence thereof) between candidate road information 312 and known road information 308, iii) determining whether there is a spatial match between location tracking information 306 and known road information 308 and iv) determining whether a speed of travel of a client 102 (for example derived from or received within location tracking information 306) exceeds a threshold. Such checks, comparisons or verification steps may be performed in serialized fashion (for example, in any suitable order or sequence) or may be performed in parallel. In the case of serialized verification steps, some of the steps may only be performed if a preceding verification step was successful.

To facilitate cases such as the above in which the validation of a candidate road may also be based in-part on client speed, server 106 may estimate or determine the client speed based on speed-of-travel information received from the client. The speed of travel information may comprise a speed measured or determined by the client itself (for example, using one or more sensors or using a satellite location technology), or may comprise a series of location positions received from the client (for example, in location tracking information 306) from which the server 106 may determine the client's speed via suitable processing. In examples, either the client or the server may determine the client's speed using a series of location points by evaluating a distance traveled between two of the received location points and the time it took to travel the distance.

It should be noted that a spatial resolution of the candidate road information 312 (as determined by feature recognition model 354) may be different to a spatial resolution of the location tracking information 306. The spatial resolution of the candidate road information may be related to a resolution of one or more working images 310 provided to feature recognition model 354, whereas the spatial resolution of the location tracking information may be related to a location sampling rate of a client device 102. Image resolutions of aerial images may be of the order of one to several meters per pixel, hence the route of a candidate road may be determined with fine resolution. Conversely, in order to save battery power of a mobile client device 102, a low location sampling rate may be configured, such as one sample every 10 seconds. At vehicular speeds, this may correspond to tens or hundreds of meters between time-consecutive samples within location tracking information 306—a spatial resolution far lower than that available using the aerial imagery. Thus, in some embodiments of system 200, feature recognition processing of aerial images may be used in combination with location tracking information to not only validate (or provide greater certainty on) the presence of a road, but also to significantly improve the spatial resolution of an identified road over that achievable using location tracking information alone.

FIG. 3C illustrates a further example configuration of a server 106 of a road identification and validation system 200 according to some embodiments.

In the above description of FIG. 3B, aerial image selection manager 352 may select working images 310 to apply to feature recognition manager 354 in accordance with specific instructions received from an administrator 197 of system 200 or such that a geographical region is systematically scanned for the presence of road information. In contrast, in FIG. 3C, additional information (land ownership information 304, location tracking information 306 or known road information 308) is provided to aerial image selection manager 352 to intelligently and dynamically focus the available processing capacity of feature recognition model 354 towards a specific geographical region of interest. As an illustrative example, aerial image selection manager 352 may receive location tracking information 306 detailing the route of one or more journeys traveled by one or more clients 102 that do not align with the routes of any known roads (as may be determined by aerial image selection manager 352 through its receipt of known road information 308). Alternatively, or additionally, aerial image selection manager 352 may also receive land ownership information 304 and determine that the traveled route of the one or more clients 102 (as comprised within location tracking information 306) crosses privately owned land. As a result of determining that a traveled route does not align with known roads, and/or that it crosses privately-owned land, aerial image selection manager 352 may be configured to select one or more aerial images (from aerial images 302) to supply to feature recognition model 354 for analysis in an attempt to identify and classify the road that may have been used for the journey(s). Image selection manager 352 may select the one or more aerial images (working images 310) to specifically cover the same geographical region in which the potential presence of a road not known to road mapping database 326 has been identified. In examples, to accomplish the selection, image selection manager 352 may first determine the geographical region of interest by comparing the location tracking information 306 with the known road information 308 and identifying regions or sections of the route in which there is an absence of overlap. Alternatively, image selection manager 352 may compare the location tracking information 306 with the land ownership information 304 to determine portions of the traveled route that cross privately-owned land. Once the geographical region of interest has been identified, aerial image selection manager 352 may send an aerial image request 303 to aerial image storage 320 to retrieve corresponding aerial images 302 that cover this same geographical region of interest. The retrieved images may then be provided to feature recognition model 354 in the form of one or more working images 310 for further processing.

It shall be appreciated that the location tracking information 306 (received for example from location tracking storage 324) may relate to a journey of a single client or to multiple journeys of potentially multiple different clients. In some embodiments therefore, server 106 may be able to determine how often certain routes are traveled and to form a density or popularity of traveled routes. Thus, in some examples, road identification and validation manager 350 may determine whether or not to retrieve and process aerial images for a geographical region of interest based on a traveled route 'density' rather than on just a single traveled route. By means of example, road identification and validation manager 350 may determine using location tracking information 306 that a section of a route which does not align with known roads has been traveled 10 times, for example by different clients. Server 106 may also determine that this exceeds a predetermined density threshold, above which server 106 will initiate a search for the suspected road using satellite imagery. More generally, when performing any of the operations described within this disclosure, server 106 may use location tracking information 306 that either relates to a single client or journey, or to multiple different journeys made by potentially multiple different clients. Server 106 may also base determinations on a density of traveled routes in lieu of a single traveled route.

Once appropriate aerial images have been retrieved or selected by aerial image selection manager 352, feature recognition model 354 may then process the working images 310 in an attempt to identify or classify any features within the images that resemble roads. Per the description of FIG. 3B, feature recognition model 354 may pass information 312 concerning the presence of any candidate roads to road validation manager 356. Again, per the description of FIG. 3B, road validation manager 356 may then validate the candidate road information 312 through the use of additional informational inputs (such as land ownership information 304, location tracking information 306 or known road information 308). In examples, road validation manager 356 may compare the route of a candidate road (as provided within candidate road information 312) with a traveled route of a client 102 (as provided within location tracking information 306) in order to determine whether there is a spatial match between them. In the case that a spatial match is identified, road validation manager 356 may provide updated road information 314 to road mapping database 326 in order that the presence of the newly identified road is recorded. In further examples, road validation manager 356 may verify whether or not the traveled route (or a portion thereof) of client 102 (as determined from location tracking information 304) traverses privately-owned land and may only update road mapping database 326 in the case that it does. In yet further examples, road validation manager 356 may compare the route of a candidate road (as provided within candidate road information 312) with the routes of known roads (as provided within known road information 308) in order to determine whether there is a spatial match between them. In the case that a spatial match is identified as being absent for at least a segment of the candidate road, road validation manager 356 may provide road information 314 to road mapping database 326 in order that the presence of the newly identified road or road segment (that does not align with any known roads) is recorded.

In this manner, a system 200 configured in accordance with the example of FIG. 3C is able to intelligently utilize various additional information sources (such as land ownership information, location tracking information 306 or known road information 308) to identify specific areas of terrain that have a high likelihood of containing roads (optionally of a specific type such as private or leased roads) currently unknown to road mapping database 326. The system is then able to retrieve corresponding aerial images of these areas of terrain and to direct the available processing power of a feature recognition model 354 towards the task of identifying or classifying roads from the images of the specific terrain of interest. Any candidate roads that are identified as the result of the image recognition processing may then be filtered or validated using the additional information sources prior to their inclusion within road mapping database 326. Such a system is therefore able to intelligently focus available image-recognition processing power on areas of terrain most likely to yield useful results. Such a system is also able to autonomously identify and validate the presence of roads without significant human supervision.

In the examples of FIGS. 3B and 3C, aerial image selection manager 352 or road validation manager 356 may need to determine whether a spatial match exists between a first plurality of coordinates (such as a history of locations along a route traveled by a client 102) and a second plurality of coordinates (such as the route of candidate road as identified by a feature recognition model using aerial images). In embodiments, the presence of a spatial match may be determined by performing a spatial correlation between the first and second pluralities of coordinate points.

The first plurality of (two-dimensional—2D) coordinate points may be represented as a first series of tuples $\{(x_1,y_1), (x_2,y_2), \ldots (x_n,y_n)\}$ and the second plurality of 2D coordinate points may be represented as a second series of tuples $\{(u_1,v_1), (u_2,v_2), \ldots (u_m,v_m)\}$.

The spatial correlation may take various forms. Whilst the following description illustrates how a spatial match or a spatial correlation between a first and second plurality of coordinate points may be determined, it shall be appreciated that these serve as exemplars only. In one exemplary embodiment, in a first step, the Euclidean distance (or another suitable distance metric) between all possible pairings of the n points of the first series and the m points of the second series is computed. The Euclidean distance between a point $(x_i,y_i)$ and a point $(u_j,v_j)$ may be determined as:

$$d_{i,j} = \sqrt{(u_j-x_i)^2 + (v_j-y_i)^2}$$

For each point $(x_i,y_i)$ within the first series $\{(x_1,y_1), (x_2, y_2), \ldots (x_n,y_n)\}$, a nearest point within the second series $\{(u_1,v_1), (u_2,v_2), \ldots (u_m,v_m)\}$ may then be determined using the previously calculated Euclidean distances $d_{i,j}$. This minimum distance for each $i^{th}$ point in the first series may be denoted $e_i$. An overall correlation metric M may then be determined based on a sum or average of these minimum distances $e_i$ or their square $e_i^2$, for example:

$$M = \frac{1}{n}\sum_{i=1}^{n} e_i \text{ or } M = \frac{1}{n}\sum_{i=1}^{n} e_i^2$$

In this example, large values of M represent a low degree of spatial correlation between the first and second series of coordinate points (due to a large average minimum distance) whereas small values of M represent a high degree of spatial correlation (due to a small average minimum distance). M may be compared to one or more correlation thresholds (T) in order to determine whether a spatial match has been identified. For example, a spatial match may be identified if M<T, whereas a spatial match is not identified if M≥T.

Numerous alternative correlation metrics M may also be used such as:

$$M = \frac{1}{n}\sum_{i=1}^{n}\frac{1}{e_i} \text{ or } M = \frac{1}{n}\sum_{i=1}^{n}\frac{1}{e_i^2}$$

in which large values of M now represent high degrees of spatial correlation, and small values of M represent low values of spatial correlation. In this alternative example, a spatial match may then be identified if M≥T, whereas a spatial match is not identified if M<T.

Figure 4:
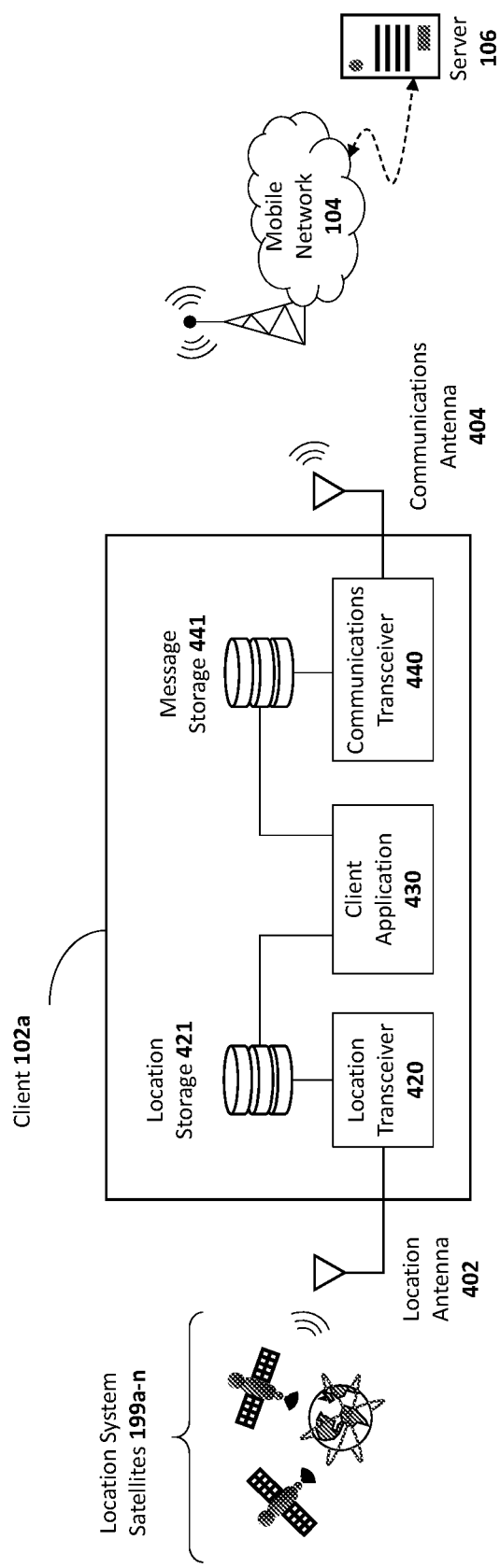
FIG. 4 shows a user client of a road identification and validation system, according to some embodiments.

FIG. 4 shows a client 102a of a road identification and validation system 200, according to some embodiments. In FIG. 4, client 102a is location enabled in that it is capable of determining its own location, for example through the use of a suitable satellite location technology such as GPS. Client 102a therefore comprises a location transceiver 420 coupled to a location antenna 402 in order that it may receive location radio signals such as those from one or more location system satellites 199a-n orbiting the earth.

Location transceiver 420 may process the location radio signals received from location system satellites 199a-n in order to measure its global location at a given time "t". Such processing may, for example, include determining a time of arrival of a plurality of radio signals (received at location antenna 402) that emanate from a respective plurality of location system satellites 199a-n. In examples, client 102a may store one or more of the measured locations in location storage 421, where they may be accessed by a client application 430.

Client application 430 may be an application, service, daemon, routine, or other executable logic for assisting a server 106 of a road identification and validation system 200. In examples, client application 430 may be configured to execute instructions on a processor of client 102a that cause client 102a to measure and store a history of its locations and to communicate such a location history to a server 106. The communication of the client's location history to the server may be performed by wired or wireless means over a network 104. In examples, client 102a includes a communications transceiver 440 coupled to a communications antenna 404 that may be the same or a different antenna to location antenna 402. The client application 430 may be configured to retrieve one or more historical client locations from location storage 421 and to wirelessly transmit this client location history over a mobile network 104 to server 106. Mobile network 104 may comprise one or more wireless basestations and one or more core network components.

In embodiments, client application 430 may be configured to transmit, on an ongoing and semi-real-time basis, the most recent stored location that is available within location storage 421. In this manner, client 102a provides a "live" or current location update to server 106. There may be times however when client 102a is either unable to communicate with server 106 (for example when out of signal coverage of mobile network 104) or is configured not to communicate a live location (for example to conserve battery power of the client 102 or to conserve radio communication bandwidth and resources). In such cases, client application 430 may be configured to retrieve a plurality of historical locations from location storage 421 and to transmit these as a batch of locations to server 106. Thus, client 102a may operate either in a 'live update' fashion, or in a 'store-and-forward' manner in which the client only sends or 'uploads' a batch of historical location points to server 106 at a point in time that may be substantially after the time at which the location points were measured.

The preceding description of FIG. 4 illustrates examples of the operation of client 102a and client application 430 in the context of recording a client location history and communicating this to a server 106, where it may be subsequently used to assist in the identification and validation of roads not known to a road mapping database 326. In examples, client application 430 may also include additional functionality to assist server 106 in this task and to enrich the information that may be stored within road mapping database 326.

Examples of such additional functionality are described with reference to FIG. 5 showing an illustration of example interactions between a server 106, a client 102a and a user 190a of a road identification and validation system 200, according to some embodiments. In FIG. 5, interactions between the server, client and user are shown in the form of a message sequence chart in which time increments vertically, from top to bottom. Within server 106, interactions with a client 102 such as client 102a may, in examples, be handled and controlled by a client interaction manager 358 of a road identification and validation manager 350. Client interaction manager 358 may therefore be responsible for sending, receiving, buffering and processing messages to and from a client 102 according to the application or communication protocols utilized by the system 200.

Referring to FIG. 5 in more detail, server 106 may initially exchange one or more messages 505 with a client application 430 of client 102a in order to establish a connection between the server and the client and to perform an initial configuration of the client application. In examples, the connection establishment and initial configuration messages 505 may facilitate an authentication of the user 190a, a configuration of network addresses and resources to be used, a configuration of data transport security, a periodicity of location updates, a communication of default user preferences and so forth.

In examples, following its initial configuration, client 102a may transmit or upload (in message 510) location tracking information 306 to server 106. As aforementioned this may include either a current 'live' location update, or a batch of locations that were previously recorded by client 102a.

On receipt of the location tracking information 306 in message 510, server 106 may, in step 550, identify that a route of the client or user does not correspond to the routes of roads known to a road mapping database 326. Optionally, in some examples, step 550 may additionally include identifying that the route of the client or user also crosses privately owned land. In examples, step 550 may include comparing the location tracking information 306 to known road information 308 in order to identify whether a route traveled by client 102a aligns with (or has a spatial correlation to) the routes of roads known to road mapping database 326. In the event that a positive identification results from step 550, server 106 may, in examples, send an indication or request message 515 to client 102a. In some examples, message 515 may indicate that a route of the user or client is (or was) not on known roads—i.e. that the route does not align with the routes of roads known to road mapping database 326. In other examples, message 515 may comprise a request to the client 102a or user 190a for additional information or 'metadata' regarding the route traveled. In examples, indication or request message 515 may also include information (such as geographical locations, dates or times of day) that allows the client 102*a* or user 190*a* to identify the traveled route to which the server 106 is referring and may additionally identify or highlight one or more segments of the route that do not align with known roads. In further examples, indication or request message 515 may identify or highlight one or more segments of the route that do not align with known roads and which traverse privately-owned land.

On receipt of the indication or request message 515 by client 102*a*, a client application 430 of the client may, in step 555, cause a user interface or dialogue to be displayed to user 190*a* via a display device or screen 124*a* of the client. In examples, the user interface or dialogue may indicate to the user 190*a* that a current or previously traveled route does not align with known roads and may request that the user input additional information or metadata associated with the traveled route or road. In response to the user interface or dialogue, user 190*a* may input in step 520 (for example via a keyboard 126, pointing device 127, display device 124*a-n*, or any other suitable I/O device 132*a-n*) metadata associated with the traveled route.

Metadata associated with the traveled route may comprise any additional information (i.e. beyond a geographical location) regarding the route or segment of unknown road as identified by the server 106. In examples, such metadata may include a road surface type, a road surface quality, a road width, a capability to carry a vehicle type, a photograph of the road, a destination reachable via the road (such as an oilfield well site) or another oilfield feature accessible via the road.

Client 102*a* may then upload the metadata to a client interaction manager 358 of the server 106. The metadata may be comprised within in one or more messages 525.

Having identified (in step 550) that a traveled route of a client or user is not on known roads, server 106 may, in examples, not only solicit additional metadata regarding an unknown road from the client or user (via indication or request message 515), but also undertake additional steps in an attempt to identify and validate the unknown road using other information sources such as aerial images. In examples, server 106 may, in step 560, retrieve aerial images corresponding to the identified location(s) in which the traveled route deviates from the path of known roads. As previously described with reference to FIGS. 3B and 3C, the resulting working images 310 may then be provided to a feature recognition model 354 within server 106 for processing to identify or classify any features therein that resemble roads. A road validation manager 356 within server 106 may additionally validate or confirm the presence of a candidate road, in a similar manner to as previously described with reference to FIGS. 3B and 3C. If confirmed, road validation manager 356 may update road mapping database 326 with information 314 concerning the newly identified road. As a result of using aerial images in step 560 to assist in identifying the route of the road, server 106 is able to determine updated road information 314 that has an improved (finer) spatial resolution than is available from the received location tracking information 306 alone (as received in step 510).

In further examples of interaction between server 106 and client 102*a*, indication or request message 515 may cause the client 102*a* (for example via the resulting user interface dialogue or display 555) to solicit information from the user 190*a* as to whether the traveled route did in-fact utilize a road. This step may therefore be used to provide an additional degree of validation to prevent accidental inclusion within the road mapping database 326 of any routes corresponding to journeys that used off-road trails, for example in ATV vehicles specially adapted for this purpose.

As a final step 565, following receipt (in message(s) 525) of the metadata input by user 190*a*, server 106 may store in road mapping database 326, the received metadata along with the location information of the newly identified road. Server 106 may also store in the database, additional information concerning the road such as whether it lies on privately or publicly owned land.

Thus, in the examples that have been described with reference to FIG. 5, it shall be appreciated that system 200 is able not only able to autonomously identify roads previously unknown to a road mapping database 326, but is also capable of proactively soliciting, from a user, additional information or metadata concerning any newly identified road, such as its road surface type, its condition, its ability to carry certain types of vehicles, its appearance (via a photograph) and so forth. The additional information or metadata enriches the overall information available to system 200 thereby enhancing the navigational assistance and experience that it is able to provide to other users.

In some embodiments, client 102*a* may be a smartphone, a tablet computer or a laptop, and may comprise one or more sensors 132*a-n*, for example including (but not limited to) a gyroscope, a barometer, an accelerometer, a magnetometer, a light sensor, a proximity sensor or a camera. In examples, the metadata uploaded by client 102*a* to server 106, for example in message(s) 525, may include information that is derived from the one or more sensors. By means of illustration, the metadata may include a photograph captured by a camera sensor of client 102*a* or may include vibration data derived from an accelerometer sensor of client 102*a* (which may be indicative of a road surface type or quality). Sensors of client 102*a* may also be used to improve the accuracy of measured client locations, or to interpolate between locations measured using satellite location technology. For example, an accelerometer sensor, a magnetometer sensor and/or a gyroscope sensor may be used to determine a location of the client 102*a* based on the last known measurement using satellite location technology and an extrapolation therefrom using principles of dead reckoning (for example based on a measured speed and a heading or trajectory of the client). In further examples, a barometer sensor may be used to determine an altitude measurement, or to interpolate or refine an altitude measurement made using satellite location technology. In further examples, information from an accelerometer or other suitable sensor may be processed to determine a speed of a client device. In some embodiments, such sensor-based location estimates may be recorded internally to the client 102*a* (for example in location storage 421) and subsequently transmitted to server 106 in the form of location tracking information 306 (for example within a message such as message 510).

Figure 6:
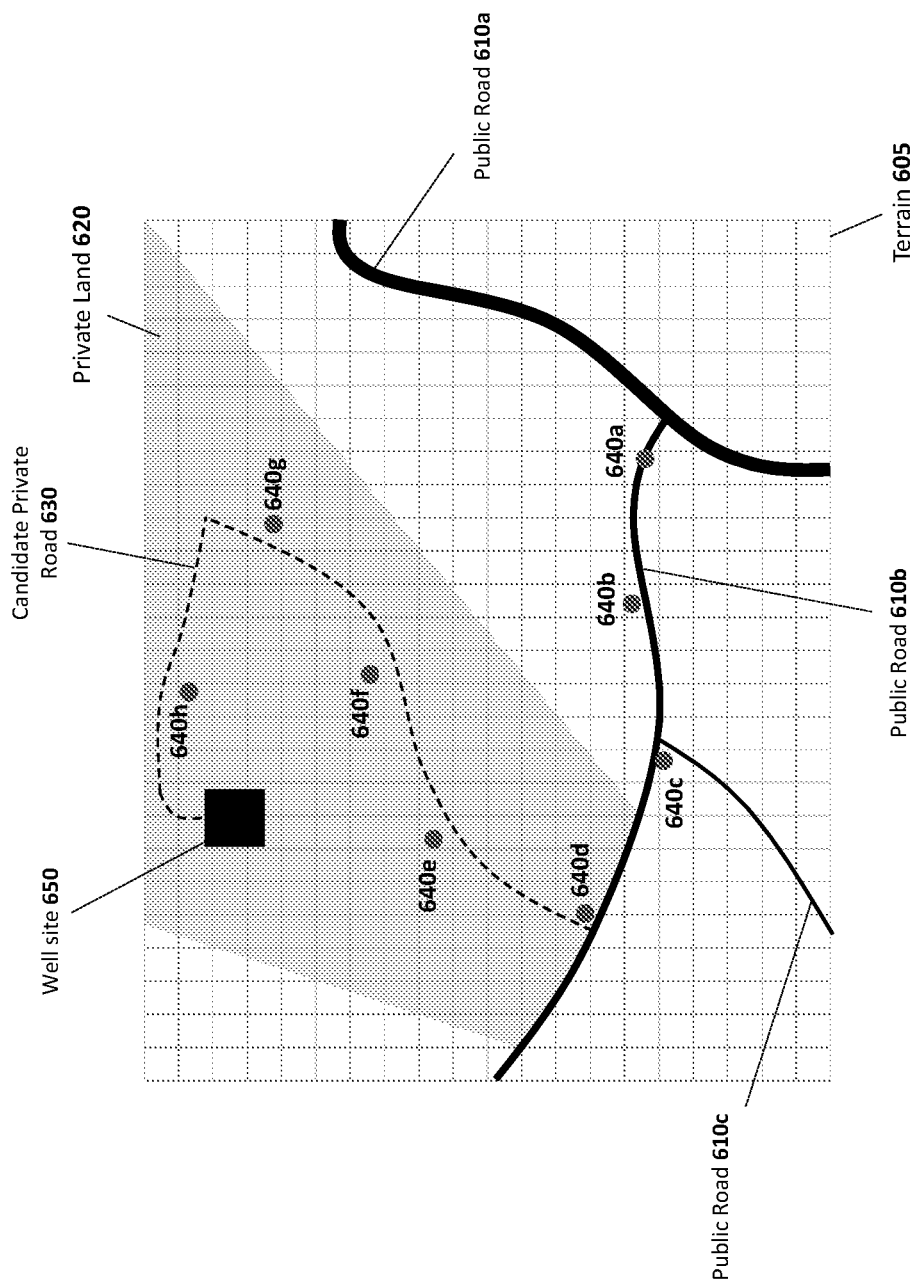
FIG. 6 shows an example portion of terrain comprising a candidate road on private land and location tracking points of a client device.

FIG. 6 shows an example portion of terrain 605 comprising a candidate road 630 on private land 620. In the example of FIG. 6, the locations and routes of public roads 610*a*, 610*b* and 610*c* may be known to a road mapping database 326 in server 106. Client 102*a* may communicate, to server 106, location tracking information 306 comprising a series of measured location points 640*a*, 640*b*, 640*c*, . . . 640*h*.

In operation, a road identification and validation manager 350 of server 106 may compare the measured location points 640*a-h* (received within location tracking information 306) with the routes of the known public roads 610*a-c*. The comparison may include determining whether a Euclidean distance "d" between each location point 640*a-h* and the nearest point on a known road is less than a threshold (for example a maximum permissible location measurement error). If the determination is positive, server 106 may determine that the route of the client aligns with the route of a known road. If the determination is negative however, server 106 may determine that the client may be on an unknown road and may therefore take steps to identify the road and/or to solicit additional information or metadata associated with the road from the client. In the example of FIG. 6, server 106 may determine that the client is on known roads until location point 640*e* (as location points 640*a-d* are all located only a small distance from public road 610*b*). On measuring the distance between location point 640*e* and the nearest known road, server 106 may determine that this exceeds an acceptable location measurement error threshold. The server may also determine (for example using land ownership information 322) that point 640*e* lies on privately-owned land. As a result, server 106 may initiate steps to identify and validate the private or leased (and unknown) road along which the client is suspected to be travelling. Examples of such steps initiated by server 106 have been previously described in this disclosure with reference to FIGS. 2, 3A, 3B, 3C, 4 and 5, and may include for example:

i) retrieving one or more aerial images spanning an area of terrain in which points 640*d-h* are located;
ii) processing the retrieved aerial images to identify candidate road features;
iii) consulting an oilfield feature database 330 or processing the retrieved aerial images to identify oilfield features such as well site 650;
iv) validating the candidate road feature, for example by determining a spatial match or spatial correlation between the candidate road feature and location tracking information 306 (comprising location points 640*d-h*), and/or by determining that client 102*a* is travelling at a vehicular speed (for example, one that exceeds a threshold indicative of a maximum pedestrian speed);
v) soliciting additional information or metadata concerning the private or leased road by sending an indication or request message 515 to the client 102*a*
vi) receiving the additional information or metadata from the client 102*a* and
vii) storing the location or route of the validated private or leased road and/or the received additional information or metadata in a road mapping database 326.

In some embodiments, server 106 may also associate other information with the newly identified road, or with the journey traveled by client 102*a*. For example, server 106 may associate well site 650 as a destination reachable via the private or leased road and may record this association within road mapping database 326. In other examples, server 106 may identify and record (for example within road mapping database 326) the intersections of a private or leased road with public roads or may record a point of entry from publicly owned land into privately owned land or vice versa. In further examples, server 106 may hold or retrieve (from a user 190 or client 102) information regarding an employer or job function of the user 190 of client 102 and may use this to track which routes are commonly traveled, or which destinations are commonly visited by employees, workers or types of workers associated with a given employer or commercial entity.

Figure 7:
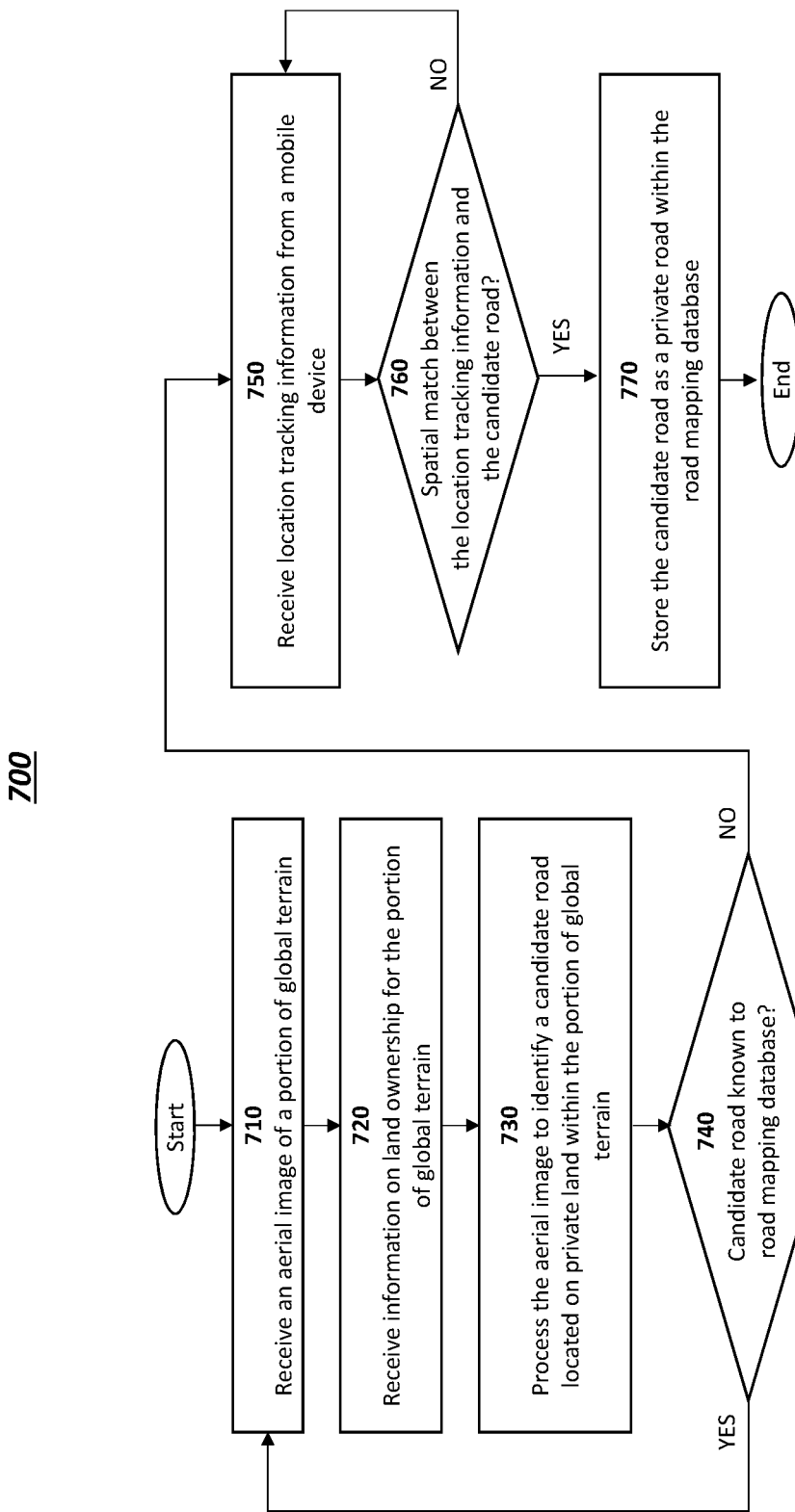
FIG. 7 illustrates an example of a method in a server for identifying and validating roads unknown to a road mapping database, according to some embodiments.

FIG. 7 illustrates an example of a method in a server for identifying and validating roads unknown to a road mapping database, according to some embodiments. The method is represented as a flowchart. At 'start', the method proceeds to step 710 in which the server 106 receives an aerial image 302 of a portion of global terrain. At step 720, server 106 also receives information on land ownership 304 for the portion of global terrain. In examples, the land ownership information 304 may comprise information as to whether areas of land within the portion of global terrain are privately or publicly owned. At step 730, server 106 processes the aerial image to identify a candidate road located on private land within the portion of global terrain. In examples, the processing may include feature recognition analysis using artificial intelligence algorithms or a neural network. The method may then proceed to decision step 740 in which server 106 determines whether or not the candidate road is known to a road mapping database 326. The determination may include determining whether there is a spatial match between a route of the candidate road and the routes of any roads known to the road mapping database. If the outcome of decision step 740 is NO (i.e. the candidate road is not already known), the method proceeds to step 750, otherwise the method either reverts to step 710 to receive and process another aerial image (as illustrated) or ends (not illustrated). At step 750, server 106 receives location tracking information 306 from a mobile device such as a client 102. At decision step 760, the server determines whether there is a spatial match between the location tracking information 306 and the candidate road that was identified in step 730 and verified to be unknown to the road mapping database 326 in step 740. If the outcome of decision step 760 is NO, the method either reverts to step 750 as illustrated (to await the arrival of any further location tracking information from a mobile device that may align with the candidate road) or ends (not illustrated). If the outcome to decision step 760 is YES, the method proceeds to step 770 in which the candidate road is stored as a private road within the road mapping database 326. The method then ends.

Figure 8:
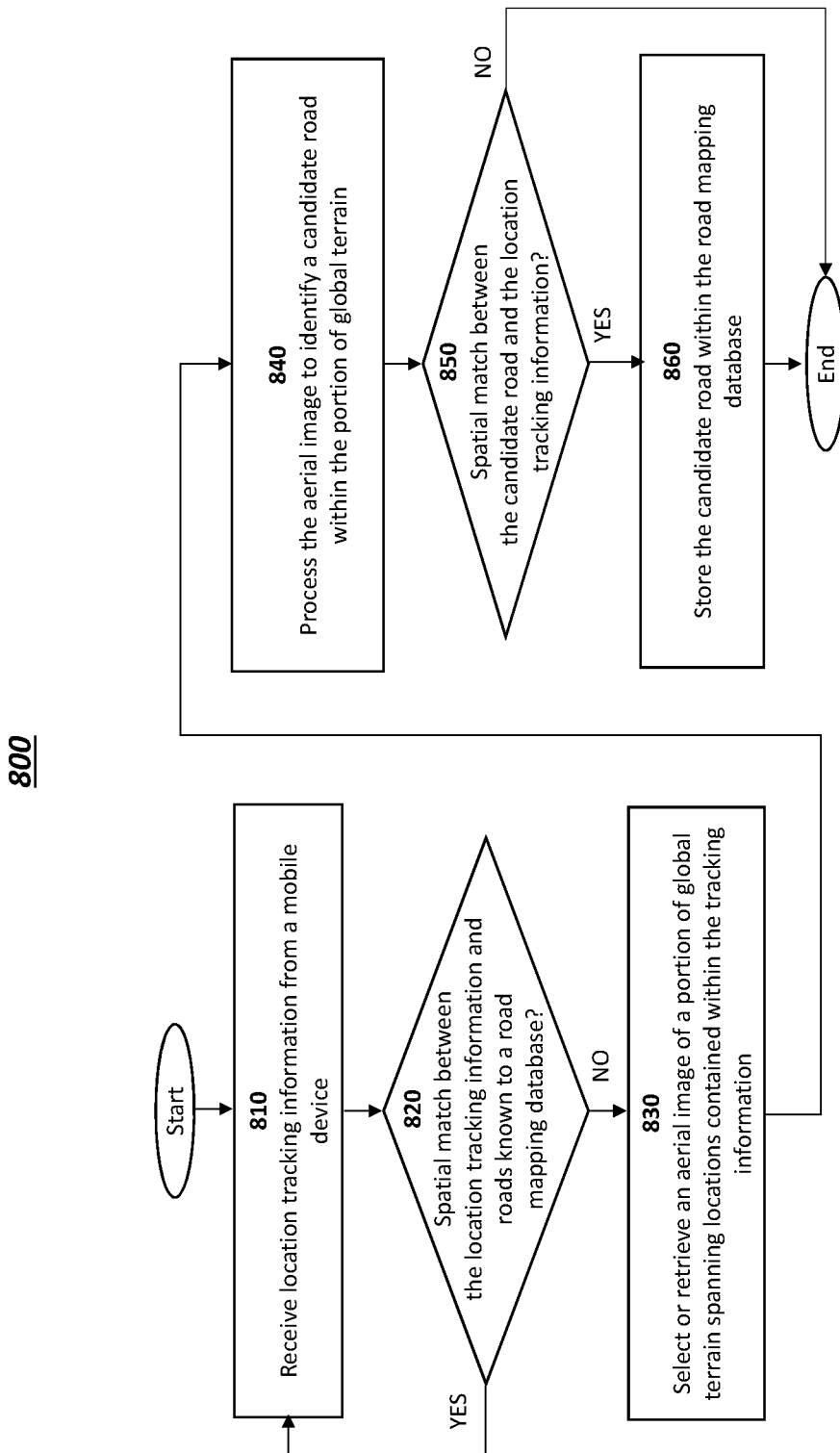
FIG. 8 illustrates a further example of a method in a server for identifying and validating roads unknown to a road mapping database, according to some embodiments.

FIG. 8 illustrates a further example of a method in a server for identifying and validating roads unknown to a road mapping database, according to some embodiments. The method is represented as a flowchart. At 'start', the method proceeds to step 810 in which the server 106 receives location tracking information 306 from a mobile device or client 102. At decision step 820, server 106 determines whether there is a spatial match between the location tracking information 306 and roads known to a road mapping database 326. If the outcome of decision step 820 is NO (i.e. the location tracking information describes a route that does not align with the routes of any known roads in road mapping database 326), then the method proceeds to step 830, otherwise the method either reverts to step 810 to await the receipt of further location tracking information (as illustrated) or ends (not illustrated). At step 830, server 106 selects or retrieves an aerial image of a portion of global terrain spanning locations contained within the tracking information. At step 840, server 106 processes the aerial image to identify a candidate road within the portion of global terrain. Optionally (and not shown), step 840 may additionally comprise identifying whether the candidate road crosses privately-owned land. At decision step 850, server 106 determines whether there is a spatial match between the candidate road identified in step 840 and the location tracking information 306 received in step 810. If the outcome of decision step 850 is NO (i.e. the candidate road does not align with a route traveled by client 102 comprised within location information 306) then the method ends (as illustrated) or alternatively, may revert to step 840 to further process the aerial image to identify other candidate roads (not illustrated). Conversely, if the outcome of decision step

850 is YES, the method proceeds to step 860 in which server 106 stores the candidate road within the road mapping database 326. Optionally (and not shown), step 860 may include server 106 storing the candidate road as a private road within the road mapping database 326, or only performing the storing of the road if the road is determined to cross privately-owned land. The method then ends.

The above systems, devices, methods, processes, and the like may be realized in hardware, software, or any suitable combination of these. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof and may be distributed across devices in several ways. At the same time, processing may be distributed across devices such as the various systems described above, or all the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity and need not be located within a particular jurisdiction.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the disclosure as defined by the following claims, which are to be interpreted in the broadest sense allowable by law.

What is claimed is:

1. A computer-implemented method for mapping new roads, the method to be carried out by at least one processor executing instructions, the method comprising:
   receiving, by the at least one processor, location tracking information from at least one mobile device, the location tracking information comprising a plurality of recorded mobile device location points;
   determining, by the at least one processor, an absence of a spatial match between the location tracking information and known roads from a database;
   identifying, by the at least one processor, a new road based on the location tracking information;
   retrieving, by the at least one processor, information regarding an employer or job function of a user of the mobile device;
   identifying, by the at least one processor, a feature of interest to the energy industry accessible via the new road based on the information regarding the employer or the job function of the user of the mobile device;
   mapping, by the at least one processor, the new road to the feature of interest based on the location tracking information.

2. The method of claim 1, wherein the at least one mobile device includes a plurality of mobile devices.

3. The method of claim 1, further comprising determining a density of travel on the new road.

4. The method of claim 3, wherein determining the density of travel on the new road is performed based on a number of recorded journeys on the new road.

5. The method of claim 1, further comprising processing an aerial image of a portion of global terrain containing the new road to confirm the presence of the new road.

6. The method of claim 5, wherein processing the aerial image includes accessing the aerial image to determine a plurality of points along a section of the new road that lie substantially in-between a time-consecutive pair of recorded mobile device location points within the location tracking information, and storing the plurality of points as points of the new road such that a spatial resolution of the new road is higher than a spatial resolution of the location tracking information.

7. The method of claim 1 further comprising determining at least one intersection of the new road with a public road and storing the at least one intersection in the road mapping database.

8. The method of claim 1 further comprising associating, by the at least one processor, the energy industry feature as a destination accessible via the new road in the road mapping database.

9. The method of claim 1, further comprising identifying the energy industry feature according to the job information.

10. The method of claim 1, wherein the energy industry feature comprises one of:
an oilfield development site;
a frac-water pit, frac pond or frac-water impoundment;
a well pad;
a drilling rig;
pipeline infrastructure;
a service road;
a clearing;
a tank battery;
a proppant store;
a drilling reserve pit;
a frac spread;
a sand mine;
a producing well;
a flare system,
solar panel arrays,
wind energy collectors,
hydroelectric structures,
saltwater disposal wells,
water wells,
energy storage facilities, and
electrical substations.

11. A system configured for mapping new roads, the system including at least one processor configured to execute instructions stored in a computer memory, the instructions configured to cause the at least one processor to:
receive location tracking information from at least one mobile device, the location tracking information comprising a plurality of recorded mobile device location points;
determine a departure from known roads based on an absence of a spatial match between the location tracking information and known roads from a database;
identify a new road based on the location tracking information;
retrieve information regarding an employer or job function of a user of the mobile device;
identify a feature of interest to the energy industry accessible via the new road based on the information regarding the employer or the job function of the user;
map the new road to the feature of interest based on the location tracking information.

12. The system of claim 11, wherein the at least one mobile device includes a plurality of mobile devices.

13. The system of claim 11, wherein the instructions are further configured to cause the processor to determine a density of travel on the new road.

14. The system of claim 13, wherein the instructions are further configured to cause the processor to determine the density of travel on the new road based on a number of recorded journeys on the new road.

15. The system of claim 11, wherein the instructions are further configured to cause the processor to process an aerial image of a portion of global terrain containing the new road to confirm the presence of the new road.

16. The system of claim 15, wherein the instructions are further configured to cause the processor to process the aerial image by accessing the aerial image to determine a plurality of points along a section of the new road that lie substantially in-between a time-consecutive pair of recorded mobile device location points within the location tracking information, and
to store the plurality of points as points of the new road such that a spatial resolution of the new road is higher than a spatial resolution of the location tracking information.

17. The system of claim 11, wherein the instructions are further configured to cause the processor to determine at least one intersection of the new road with a public road and storing the at least one intersection in the road mapping database.

18. The system of claim 11, wherein the instructions are further configured to cause the processor to associate the energy industry feature as a destination accessible via the new road in the road mapping database.

19. The system of claim 11, wherein the instructions are further configured to cause the processor to identify the energy industry feature according to the job information.

20. The system of claim 11, wherein the energy industry feature comprises one of:
an oilfield development site;
a frac-water pit, frac pond or frac-water impoundment;
a well pad;
a drilling rig;
pipeline infrastructure;
a service road;
a clearing;
a tank battery;
a proppant store;
a drilling reserve pit;
a frac spread;
a sand mine;
a producing well;
a flare system,
solar panel arrays,
wind energy collectors,
hydroelectric structures,
saltwater disposal wells,
water wells,
energy storage facilities, and
electrical substations.

* * * * *